US011302948B2

(12) United States Patent
Benicewicz et al.

(10) Patent No.: US 11,302,948 B2
(45) Date of Patent: *Apr. 12, 2022

(54) POLYBENZIMIDAZOLE (PBI) MEMBRANES FOR REDOX FLOW BATTERIES

(71) Applicant: UNIVERSITY OF SOUTH CAROLINA, Columbia, SC (US)

(72) Inventors: Brian C. Benicewicz, Columbia, SC (US); Laura Murdock, Columbia, SC (US); Lihui Wang, West Columbia, SC (US); Fei Huang, West Columbia, SC (US); Andrew Pingitore, Columbia, SC (US)

(73) Assignee: University of South Carolina, Columbia, SC (US)

( * ) Notice: Subject to any disclaimer, the term of this patent is extended or adjusted under 35 U.S.C. 154(b) by 58 days.

This patent is subject to a terminal disclaimer.

(21) Appl. No.: 16/570,290

(22) Filed: Sep. 13, 2019

(65) Prior Publication Data
US 2020/0091536 A1 Mar. 19, 2020

Related U.S. Application Data

(60) Provisional application No. 62/731,156, filed on Sep. 14, 2018.

(51) Int. Cl.
H01M 8/1027 (2016.01)
H01M 4/92 (2006.01)
(Continued)

(52) U.S. Cl.
CPC ....... H01M 8/1027 (2013.01); H01M 4/8828 (2013.01); H01M 4/92 (2013.01);
(Continued)

(58) Field of Classification Search
None
See application file for complete search history.

(56) References Cited

U.S. PATENT DOCUMENTS 4,473,682 A 9/1984 Calundann et al.
4,522,974 A 6/1985 Calundann et al.
(Continued)

FOREIGN PATENT DOCUMENTS

CN 101814611 8/2010
CN 103881127 6/2014
(Continued)

OTHER PUBLICATIONS

International Searching Authority. "International Search Report and Written Opinion" PCT/US2019/051036 (dated Jan. 29, 2020) pp. 1-11.
(Continued)

Primary Examiner — Daniel S Gatewood
(74) Attorney, Agent, or Firm — Dority & Manning, P.A.

(57) ABSTRACT

Disclosed are redox flow battery membranes, redox flow batteries incorporating the membranes, and methods of forming the membranes. The membranes include a polybenzimidazole gel membrane that is capable of incorporating a high liquid content without loss of structure that is formed according to a process that includes in situ hydrolysis of a polyphosphoric acid solvent. The membranes are imbibed with a redox flow battery supporting electrolyte such as sulfuric acid and can operate at very high ionic conductivities of about 100 mS/cm or greater. Redox flow batteries incorporating the PBI-based membranes can operate at high current densities of about 100 mA/cm² or greater.

23 Claims, 7 Drawing Sheets

(51) Int. Cl.
  *H01M 4/88* (2006.01)
  *H01M 8/1032* (2016.01)
  *H01M 8/1048* (2016.01)
  *H01M 8/1067* (2016.01)
  *H01M 8/1081* (2016.01)
  *H01M 8/1044* (2016.01)
  *H01M 4/86* (2006.01)

(52) U.S. Cl.
  CPC ....... *H01M 8/1032* (2013.01); *H01M 8/1044* (2013.01); *H01M 8/1048* (2013.01); *H01M 8/1067* (2013.01); *H01M 8/1081* (2013.01); *H01M 4/8605* (2013.01)

(56) References Cited

U.S. PATENT DOCUMENTS

| | | | |
|---|---|---|---|
| 4,746,694 | A | 5/1988 | Charbonneau et al. |
| 4,786,567 | A | 11/1988 | Skyllas-Kazacos et al. |
| 4,898,917 | A | 2/1990 | Sansone |
| 5,114,612 | A | 5/1992 | Benicewicz et al. |
| 5,198,551 | A | 5/1993 | Benicewicz et al. |
| 5,315,011 | A | 5/1994 | Benicewicz et al. |
| 5,382,665 | A | 1/1995 | Benicewicz et al. |
| 5,475,133 | A | 12/1995 | Douglas et al. |
| 5,575,949 | A | 11/1996 | Benicewicz et al. |
| 5,583,169 | A | 12/1996 | Wrobleski et al. |
| 5,658,649 | A | 8/1997 | Benicewicz et al. |
| 5,840,376 | A | 11/1998 | Smith et al. |
| 6,458,968 | B2 | 10/2002 | Benicewicz et al. |
| 6,765,076 | B2 | 7/2004 | Benicewicz et al. |
| 6,987,163 | B2 | 1/2006 | Cabasso et al. |
| 7,148,311 | B2 | 12/2006 | Shao et al. |
| 7,317,066 | B2 | 1/2008 | Shao et al. |
| 7,332,552 | B2 | 2/2008 | Li et al. |
| 7,661,542 | B2 | 2/2010 | Baurmeister et al. |
| 7,696,302 | B2 | 4/2010 | Calundann et al. |
| 7,736,778 | B2 | 6/2010 | Uensal et al. |
| 7,736,779 | B2 | 6/2010 | Uensal et al. |
| 7,745,030 | B2 | 6/2010 | Uensal et al. |
| 7,820,314 | B2 | 10/2010 | Calundann et al. |
| 7,837,763 | B2 | 11/2010 | Uensal et al. |
| 8,142,917 | B2 | 3/2012 | Uensal et al. |
| 8,277,983 | B2 | 10/2012 | Calundann et al. |
| 8,323,810 | B2 | 12/2012 | Calundann et al. |
| 8,518,743 | B2 | 8/2013 | Tao et al. |
| 8,653,204 | B2 | 2/2014 | Hua et al. |
| 8,716,356 | B2 | 5/2014 | Calundann et al. |
| 8,796,372 | B2 | 8/2014 | Nelson et al. |
| 8,865,796 | B2 | 10/2014 | Benicewicz et al. |
| 9,109,070 | B2 | 8/2015 | Benicewicz et al. |
| 9,130,219 | B1 | 9/2015 | Huang et al. |
| 9,187,643 | B2 | 11/2015 | Benicewicz et al. |
| 9,249,250 | B2 | 2/2016 | Benicewicz et al. |
| 9,359,453 | B2 | 6/2016 | Benicewicz et al. |
| 9,475,922 | B2 | 10/2016 | Benicewicz et al. |
| 9,504,256 | B2 | 11/2016 | Wang et al. |
| 9,598,541 | B2 | 3/2017 | Benicewicz et al. |
| 9,683,055 | B2 | 6/2017 | Benicewicz et al. |
| 9,732,169 | B2 | 8/2017 | Wang et al. |
| 9,773,953 | B2 | 9/2017 | Li et al. |
| 9,806,365 | B2 | 10/2017 | Benicewicz et al. |
| 9,884,935 | B2 | 2/2018 | Mohammadkhani et al. |
| 10,011,674 | B2 | 7/2018 | Viswanath et al. |
| 10,090,550 | B2 | 10/2018 | Cho et al. |
| 10,112,143 | B2 | 10/2018 | Kumar et al. |
| 2004/0028976 | A1 | 2/2004 | Cabasso et al. |
| 2005/0142411 | A1 | 6/2005 | Aihara |
| 2005/0170252 | A1 | 8/2005 | Aihara |
| 2005/0186480 | A1 | 8/2005 | Aihara |
| 2005/0244694 | A1 | 11/2005 | Kiefer et al. |
| 2008/0241627 | A1 | 10/2008 | Kim et al. |
| 2009/0098437 | A1 | 4/2009 | Choi et al. |
| 2011/0000615 | A1 | 1/2011 | Larson et al. |
| 2011/0003234 | A1 | 1/2011 | Martin et al. |
| 2011/0189484 | A1 | 8/2011 | Hopkins et al. |
| 2012/0115050 | A1 | 5/2012 | Kim et al. |
| 2012/0196188 | A1 | 8/2012 | Zhang et al. |
| 2013/0183603 | A1* | 7/2013 | Benicewicz .......... C08J 5/2256 429/465 |
| 2014/0377687 | A1 | 12/2014 | Miyake et al. |
| 2015/0295262 | A1 | 10/2015 | Kunita et al. |
| 2016/0315343 | A1 | 10/2016 | Kurungot et al. |
| 2017/0098845 | A1 | 4/2017 | Kim et al. |
| 2018/0123155 | A1 | 5/2018 | Benicewicz et al. |
| 2020/0087473 | A1 | 3/2020 | Murdock et al. |
| 2020/0091539 | A1 | 3/2020 | Benicewicz et al. |

FOREIGN PATENT DOCUMENTS

| | | |
|---|---|---|
| CN | 106750441 | 5/2017 |
| CN | 106750442 | 5/2017 |
| CN | 106784947 | 5/2017 |
| JP | 2016207608 | 12/2016 |
| KR | 20120061156 | 6/2012 |
| WO | WO 2005/014474 | 2/2005 |
| WO | WO 2008/060658 | 5/2008 |
| WO | WO 2013/108111 | 7/2013 |
| WO | WO 2014/111792 | 7/2014 |
| WO | WO 2014/111793 | 7/2014 |

OTHER PUBLICATIONS

Chan, et al. "Electrochemically Enabled Sustainability: Devices, Materials and Mechanisms for Energy Conversion" *CRC Press* (2014) p. 420.

Chang, et al. "One-Step Cationic Grafting of 4-Hydroxy-Tempo and its Application in a Hybrid Redox Flow Battery with a Crosslinked PBI Membrane" *ChemSusChem* 10(16) (2017) pp. 3193-3197. (Abstract only).

Chen, et al. "High Temperature Creep Behavior of Phosphoric Acid-Polybenzimidazole Gel Membranes" *J. Polym. Sci. Part B: Polym. Phys.* 53 (2015) pp. 1527-1538.

Fishel, et al. "Solution Polymerization of Polybenzimidazole" *J. Polym. Sci. Part A: Polym. Chem.* 54 (2016) pp. 1795-1802.

Fishel, et al. "High Temperature Polymer Electrolyte Membrane Fuel Cells: Ch. 24—Electrochemical Hydrogen Pumping" *Springer Verlag* (2015) pp. 527-540.

Fishel, et al. "High Temperature Polymer Electrolyte Membrane Fuel Cells: Ch. 10—PBI Membranes Via the PPA Process" *Springer Verlag* (2015) pp. 217-238.

Garrick, et al. "Characterizing Voltage Losses in an $SO_2$ Depolarized Electrolyzer Using Sulfonated Polybenzimidazole Membranes" *J. Electrochem. Soc.* 164(14) (2017) pp. F1591-F1595.

Garrick, et al. "Polybenzimidazole Membranes for Hydrogen Production in the Hybrid Sulfur Electrolyzer" *ECS Transactions* 66(3) (2015) pp. 31-40.

Gokhale, et al. "Implementing PGM-free electrocatalysts in high-temperature polymer electrolyte membrane fuel cells" *Electrochem. Comm.* 93 (2018) pp. 91-94.

Gulledge, et al. "Investigation of Sequence Isomer Effects in AB-Polybenzimidazole Polymers" *J. Polym. Sci. Part A: Polym. Chem.* 52 (2014) pp. 619-628.

Gulledge, et al. "A New Sequence Isomer of AB-Polybenzimidazole for High-Temperature PEM Fuel Cells" *J. Polym. Sci. Part A: Polym. Chem.* 50 (2012) pp. 303-313.

Jang, et al. "Highly proton conductive, dense polybenzimidazole membranes with low permeability to vanadium and enhanced $H_2SO_4$ absorption capability for use in vanadium redox flow batteries" *J. Mater. Chem. A* 4(37) (2016) pp. 14342-14355.

Jayakody, et al. "NMR Studies of Mass Transport in High-Acid-Content Fuel Cell Membranes Based on Phosphoric Acid and Polybenzimidazole" *J. Electrochem. Soc.* 154(2) (2007) pp. B242-B246.

Li, et al. "Synthesis and Characterization of a New Fluorine-Containing Polybenzimidazole (PBI) for Proton-Conducting Membranes in Fuel Cells" *Fuel Cells* 13(5) (2013) pp. 832-842.

(56) References Cited

OTHER PUBLICATIONS

Li, et al. "Synthesis and properties of phenylindane-containing polybenzimidazole (PBI) for high-temperature polymer electrolyte membrane fuel cells (PEMFCs)" *J. Power Sources* 243 (2013) pp. 796-804.
Li, et al. "High temperature proton exchange membranes based on polybenzimidazoles for fuel cells" *Prog. Polym. Sci.* 34(5) (2009) pp. 449-477.
Luo, et al. "Porous poly(benzimidazole) membrane for all vanadium redox flow battery" *J. Power Sources* 312 (2016) pp. 45-54. (Abstract only).
Mader, et al. "Synthesis and Properties of Random Copolymers of Functionalised Polybenzimidazoles for High Temperature Fuel Cells" *Fuel Cells* 11(2) (2011) pp. 212-221.
Mader, et al. "Synthesis and Properties of Segmented Block Copolymers of Functionalised Polybenzimidazoles for High-Temperature PEM Fuel Cells" *Fuel Cells* 11(2) (2011) pp. 222-237.
Mader, et al. "Sulfonated Polybenzimidazoles for High Temperature PEM Fuel Cells" *Macromolecules* 43 (2010) pp. 6706-6715.
Mader, et al. "Polybenzimidazole/Acid Complexes as High-Temperature Membranes" *Adv. Polym. Sci.* 216 (2008) pp. 63-124.
Molleo, et al. "High Polymer Content 2,5-Pyridine-Polybenzimidazole Copolymer Membranes with Improved Compressive Properties" *Fuel Cells* 15(1) (2015) pp. 150-159.
Molleo, et al. "High Polymer Content 3,5-Pyridine-Polybenzimidazole Copolymer Membranes with Improved Compressive Properties" *Fuel Cells* 14(1) (2014) pp. 16-25.
Molleo, et al. "Encyclopedia of Sustainability Science and Technology: Ch. 13—Polybenzimidazole Fuel Cell Technology" *Springer Sci. Busi. Media* (2012) pp. 391-431.
Neutzler, et al. "Performance of vapor-fed direct dimethyl ether fuel cell utilizing high temperature polybenzimidazole polymer electrolyte membrane" *J. Power Sources* 216 (2012) pp. 471-474.
Noh, et al. "Vanadium Redox Flow Batteries Using meta-Polybenzimidazole-Based Membranes of Different Thicknesses" *ACS Appl. Mater. Interf.* 9(42) (2017) pp. 36799-36809.
Parasuraman, et al. "Review of material research and development for vanadium redox flow battery applications" *Electrochimica Acta* 101 (2013) pp. 27-40.
Peng, et al. "Thin skinned asymmetric polybenzimidazole membranes with readily tunable morphologies for high-performance vanadium flow batteries" *RSC Advances* 7 (2017) pp. 1852-1862.
Peng, et al. "A $H_3PO_4$ preswelling strategy to enhance the proton conductivity of a $H_2SO_4$-doped polybenzimidazole membrane for vanadium flow batteries" *RSC Advances* 6(28) (2016) pp. 23479-23488.
Perry, et al. "Advanced Redox-Flow Batteries: A Perspective" *J. Electrochem. Soc.* 163(1) (2016) pp. A5064-A5067.
Perry, et al. "A Comparative Study of Phosphoric Acid-Doped m-PBI Membranes" *J. Polym. Sci. Part B: Polym. Phys.* 52 (2014) pp. 26-35.
Prifti, et al. "Membranes for Redox Flow Battery Applications" *Membranes* 2 (2012) pp. 275-306.
Qian, et al. "Synthesis and Characterization of High Molecular Weight Hexafluoroisopropylidene-Containing Polybenzimidazole for High-Temperature Polymer Electrolyte Membrane Fuel Cells" *J. Polym. Sci. Part A: Polym. Chem.* 47 (2009) pp. 4064-4073.
Rastler, D. "Electrical energy storage technology options" *Electr. Power Res. Inst.* 1020676 (2010) pp. 1-161.
Razali, et al. "Exploring and Exploiting the Effect of Solvent Treatment in Membrane Separations" *ACS Appl. Mater. Interf.* 9 (2017) pp. 11279-11289.

Schönberger, et al. "Polybenzimidazole-Based Block Copolymers: From Monomers to Membrane Electrode Assemblies for High Temperature Polymer Electrolyte Membrane Fuel Cells" *J. Polym. Sci., Part A: Polym. Chem.* 55 (2017) pp. 1831-1843.
Seel, et al. "Polyphenylquinoxaline-based proton exchange membranes synthesized via the PPA Process for high temperature fuel cell systems" *J. Membr. Sci.* 405-406 (2012) pp. 57-67.
Seel, et al. "Handbook of Fuel Cells. Part II: Conductive membranes for low-temperature fuel cells: Ch. 19—High-temperature polybenzimidazole-based membranes" *John Wiley & Sons, Ltd.* (2009) pp. 1-13.
Shogbon, et al. "Determination of the Molecular Parameters and Studies of the Chain Conformation of Polybenzimidazole in DMAc/LiCl" *Macromolecules* 39 (2006) pp. 9409-9418.
Singh, et al. "Polybenzimidazole based random copolymers containing hexafluoroisopropylidene functional groups for gas separations at elevated temperatures" *Polymer* 119 (2017) pp. 134-141.
Skyllas-Kazacos, et al. "Vanadium Electrolyte Studies for the Vanadium Redox Battery—A Review" *ChemSusChem* 9(13) (2016) pp. 1521-1543.
Suarez, et al. "Multinuclear NMR Study of the Effect of Acid Concentration on Ion Transport in Phosphoric Acid Doped Poly(benzimidazole) Membranes" *J. Phys. Chem. B* 116 (2012) pp. 12545-12551.
Tang, et al. "Phosphoric acid-imbibed three-dimensional polyacrylamide/poly(vinyl alcohol) hydrogel as a new class of high-temperature proton exchange membrane" *J. Power Sources* 229 (2013) pp. 36-41.
Valtcheva, et al. "Crosslinked polybenzimidazole membranes for organic solvent nanofiltration (OSN): Analysis of crosslinking reaction mechanism and effects of reaction parameters" *J. Membr. Sci.* 493 (2015) pp. 568-579.
Wang, et al. "Sulfonated PBI Gel Membranes for Redox Flow Batteries" *J. Electrochem. Soc.* 166(8) (2019) pp. A1449-A1455.
Wang, et al. "Handbook of Thermoplastics: Ch. 19—Polybenzimidazoles" *CRC Press* (2015) pp. 617-667.
Xiao, et al. "High-Temperature Polybenzimidazole Fuel Cell Membranes via a Sol-Gel Process" *Chem. Mater.* 17 (2005) pp. 5328-5333.
Xiao, et al. "Synthesis and Characterization of Pyridine-Based Polybenzimidazoles for High Temperature Polymer Electrolyte Membrane Fuel Cell Applications" *Fuel Cells* 5(2) (2005) pp. 287-295.
Xie, et al. "Processing and Pretreatment Effects on Vanadium Transport in Nafion Membranes" *J. Electrochem. Soc.* 163(1) (2016) pp. A5084-A5089.
Yang, et al. "Fabrication of crosslinked polybenzimidazole membranes by trifunctional crosslinkers for high temperature proton exchange membrane fuel cells" *Intl. J. Hydrogen Energy* 43(6) (2018) pp. 3299-3307.
Yu, et al. "Synthesis of Poly (2,2'-(1,4-phenylene) 5,5'-bibenzimidazole) (para-PBI) and Phosphoric Acid Doped Membrane for Fuel Cells" *Fuel Cells* 9(4) (2009) pp. 318-324.
Yu, et al. "Synthesis and Properties of Functionalized Polybenzimidazoles for High-Temperature PEMFCs" *Macromolecules* 42 (2009) pp. 8640-8648.
Yuan, et al. "Advanced porous membranes with ultra-high selectivity and stability for vanadium flow batteries" *Energy Environ. Sci.* 9(2) (2016) pp. 269-272.
Zhang, et al. "Progress and prospects of next-generation redox flow batteries" *Energy Storage Mater.* 15 (2018) pp. 324-350.
Zhou, et al. "The use of polybenzimidazole membranes in vanadium redox flow batteries leading to increased coulombic efficiency and cycling performance" *Electrochimica Acta* 153 (2015) pp. 492-498.

\* cited by examiner

POLYBENZIMIDAZOLE (PBI) MEMBRANES FOR REDOX FLOW BATTERIES

CROSS REFERENCE TO RELATED APPLICATION

This application claims filing benefit of U.S. Provisional Patent Application Ser. No. 62/731,156, titled "Polybenzimidazole (PBI) Gel Membranes for Flow Batteries," having a filing date of Sep. 14, 2018, which is incorporated herein by reference for all purposes.

FEDERAL RESEARCH STATEMENT

This invention was made with Government support under Grant No. DE-AR0000767, awarded by the Department of Energy. The Government has certain rights in the invention.

BACKGROUND

Increasing demands on the energy sector have created a new need for large-scale energy storage devices with additional implications in grid management and backup power coincidentally with the seamless integration of new renewable energy devices. Redox flow batteries have an as yet unmet potential to efficiently store large amounts of energy as well as meet cost requirements for meeting such needs. Redox flow batteries perform charging and discharging by using a positive electrode electrolyte solution and a negative electrode electrolyte solution separated by an ion exchange membrane, each electrolyte solution containing metal or organic ions (active materials) that form a redox pair (alternatively referred to as a redox couple) by which valence is changed by oxidation-reduction.

Unfortunately, the widespread adoption of redox flow batteries has been limited by the high cost of device fabrication. For instance, in a vanadium redox flow battery (VRB) a major portion of the cost is attributed to the vanadium electrolytes. Such costs could be mitigated by reducing the size of the electrochemical stack. However, to accomplish this effectively and maintain high power densities the battery must be able to operate under high current loads. Traditional membranes used in redox flow batteries (generally perfluorosulfonic acid membranes such as Nafion®) are poor ionic conductors and are unable to sustain operation under high current loads, and thus the batteries incorporating these membranes require larger cell stacks at higher costs. In an attempt to reduce costs of redox flow batteries and increase overall performance, there has been a surge in membrane development activities, with limited results.

The ion exchange membrane is a primary component of a redox flow battery and has an important effect upon the output, capacity, lifespan and cost of the battery. In addition to a requirement for low crossover of redox pair electrolyte ions as well as ability to function at high current loads, the ion exchange membrane must exhibit mechanical and chemical stability and high durability. The ion exchange membrane of a redox flow battery is always immersed in an electrolyte solution, and thus must be able to resist degradation due to oxidation or the like, and the durability of the membrane becomes a main factor determining the lifespan of a redox flow battery.

Certain types of phosphoric acid (PA) doped polybenzimidazole (PBI) membranes have been considered for use in a variety of electrical applications. Traditional PBI membranes are most notably known for their performance as high temperature polymer electrolyte membranes. These traditional PBI membranes have also been considered for multiple new devices, such as electrochemical hydrogen separation, $SO_2$ depolarized electrolyzers, and redox flow batteries. To date, research on PBI membranes for redox flow batteries has focused on the traditional meta-polybenzimidazole (m-PBI) and its derivatives. Traditional PBI membranes for use in electrochemical applications have been prepared by solution casting in N,N'-dimethylacetamide (DMAc) to form a dense film followed by imbibing the formed film in the desired electrolyte, coined the "conventional imbibing process." Unfortunately, these conventional PBI membranes have been shown to exhibit extremely low ionic conductivities when imbibed in electrolyte solutions (less than 20 mS·cm$^{-1}$) and an inability to operate at current loads above about 100 mA cm$^{-2}$. Moreover, the conventional imbibing process for traditional PBI membranes is a time consuming, environmentally unfriendly technique that adds cost to the membrane fabrication process.

More recently, a process to prepare PBI gel membranes has been developed that includes direct casting of a polymerization composition comprising the PBI polymer in polyphosphoric acid (PPA) solvent. Subsequent hydrolysis of the PPA solvent to PA, which is a poor solvent for PBI, induces solidification of the PBI gel membrane that is imbibed as-formed with PA.

What is needed in the art is an ion exchange membrane for a redox flow battery that exhibits high ionic conductivity and that can operate under high current loads while also being highly stable and durable in the challenging environment of the redox flow battery.

SUMMARY

According to one embodiment, disclosed is a method for forming a redox flow battery membrane. The method can include forming a polymerization composition, the polymerization composition including a polyphosphoric acid (PPA), an aromatic or heteroaromatic tetraamino compound, and an aromatic or heteroaromatic carboxylic acid compound. The aromatic carboxylic acid compound can be an aromatic or heteroaromatic polycarboxylic acid or ester, anhydride, or acid chloride thereof or an aromatic or heteroaromatic diaminocarboxylic acid. The method also includes polymerizing the compounds of the polymerization composition, e.g., via heating, to effect polymerization of the compounds and formation of a polybenzimidazole (PBI) solution.

Following polymerization, the PBI polymer solution can be shaped to form a membrane precursor and the PPA of the solution can be hydrolyzed, thereby forming phosphoric acid (PA) and water and solidifying the polymer of the membrane precursor to form a PBI gel membrane imbibed with PA and water. The PBI gel membrane differs from previously known traditional PBI membranes, as it can incorporate high liquid content and retain structure, i.e., capable of maintaining a self-supporting structure even at a low solids content of, e.g., about 40 wt. % or less. The method can further include imbibing the PBI gel membrane with a redox flow battery supporting electrolyte, one example of which being sulfuric acid. For example, the as-formed PBI gel membrane can be washed with water several times to remove PA while maintaining a high liquid content of the as-formed PBI gel membrane (generally about 60 wt. % or more) and can then be contacted with a solution including a redox flow battery supporting electrolyte, thereby imbibing the PBI gel membrane with the supporting electrolyte and forming the redox flow battery membrane.

Also disclosed is a redox flow battery membrane that includes a PBI gel membrane (i.e., a PBI membrane that is self-supporting at high liquid content) and a redox flow battery supporting electrolyte imbided in the PBI gel membrane. The redox flow battery membrane can exhibit a high ionic conductivity, e.g., about 100 mS/cm or higher in a 2.6 M sulfuric acid solution.

Redox flow batteries incorporating the redox flow battery membranes are also described. A redox flow battery can include a redox flow battery membrane as described separating an anolyte solution and a catholyte solution. Disclosed redox flow batteries can operate at high current densities, e.g., about 100 mA/cm$^2$ or greater. A redox flow battery can include other battery components as are known in the art, e.g., electrodes, current collectors, flow lines, etc. and can include a single cell or multiple cells in a single cell stack or multiple cell stacks.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
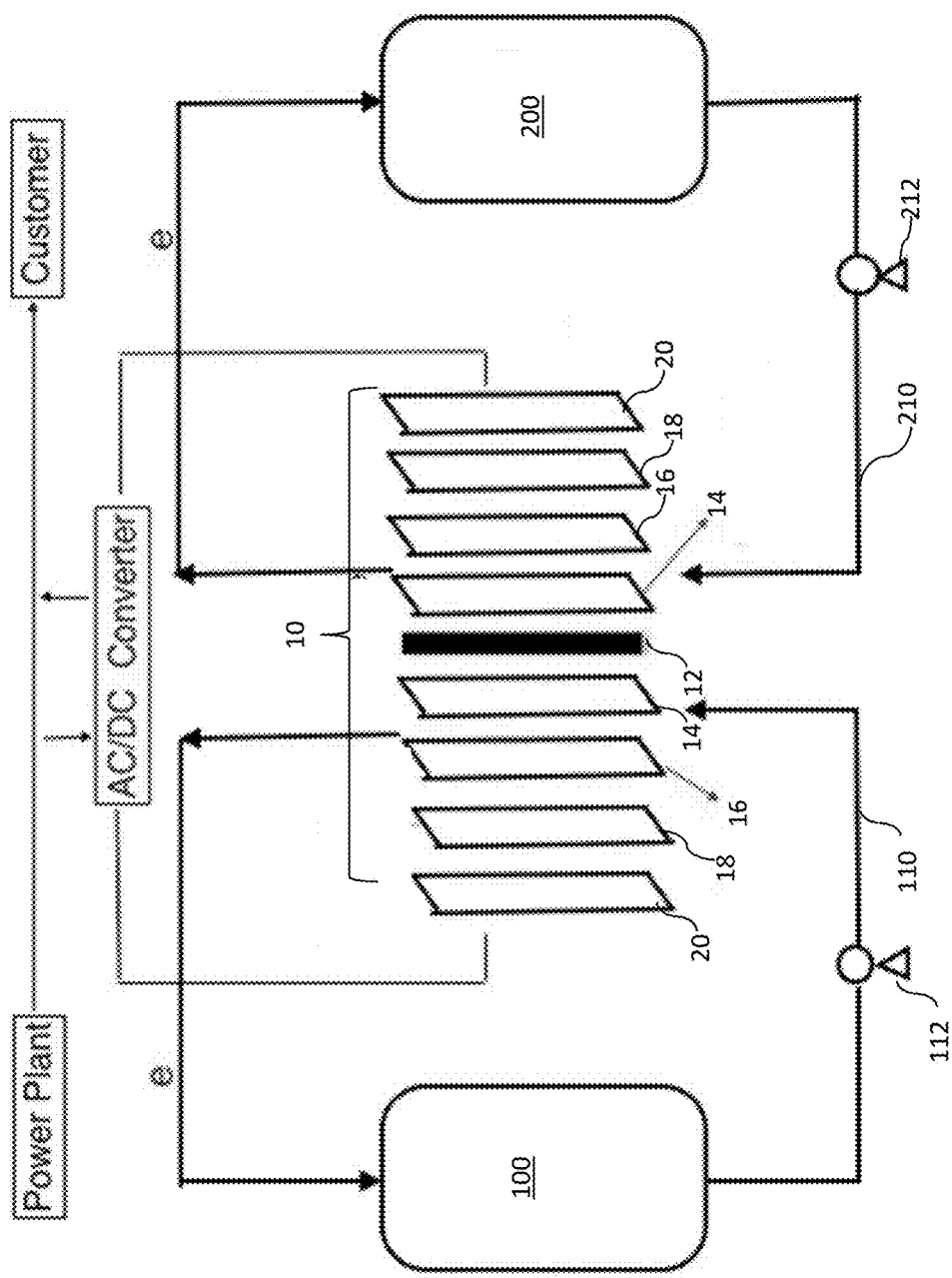
FIG. 1 schematically illustrates a redox flow battery as may incorporate a membrane as described herein.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

The present disclosure is generally directed to redox flow battery ion exchange membranes, methods for forming the membranes, and redox flow batteries incorporating the membranes. The redox flow battery membranes are based upon polybenzimidazole (PBI) membranes, and more specifically, PBI gel membranes. As utilized herein, the term "gel" generally refers to a polymeric matrix that can incorporate a high liquid content and maintain a self-supporting structure. For instance, a PBI gel membrane as described herein can incorporate about 60 wt. % or more, about 65 wt. % or more, about 75 wt. % or more, about 80 wt. % or more, or about 85 wt. % or more liquid by weight of the composite membrane (total solids plus liquid content) without loss of structure of the polymeric matrix. In one embodiment, a PBI gel membrane can incorporate from about 60 wt. % to about 95 wt. % liquid while maintaining a self-supporting, semi-rigid structure, i.e., capable of being manipulated and exhibiting pliability without loss of structure of the polymeric matrix. In addition, a PBI gel membrane can be processed to remove liquid from the gel and then re-imbibed with a liquid to re-swell without loss of structure of the polymeric matrix.

The redox flow battery membranes can exhibit high conductivity and low cell resistance, allowing operation under high current load conditions with high performance, which can translate to batteries with smaller and less costly electrochemical stacks providing the same or better performance as compared to other technologies. For instance, a redox flow battery membrane as described can exhibit an in-plane ionic conductivity in a 2.6 M sulfuric acid solution of about 100 mS/cm or greater, about 200 mS/cm or greater, or about 300 mS/cm or greater in some embodiments. Crosslinked membranes can exhibit extremely high in-plane ionic conductivity, such as about 300 mS/cm or greater, about 400 mS/cm or greater, or about 500 mS/cm or greater. For instance, a redox flow battery can exhibit an in-plane ionic conductivity in a 2.6 M sulfuric acid solution of from about 100 mS/cm to about 600 mS/cm in some embodiments.

In addition, batteries incorporating disclosed membranes can operate at high current density, for instance about 100 mA/cm$^2$ or higher, e.g., from about 100 mA/cm$^2$ to about 500 mA/cm$^2$ in some embodiments. Moreover, batteries incorporating a redox flow battery membrane as described can operate at high efficiency. By way of example, at a current density of 242 mA/cm$^2$ a redox flow battery incorporating a membrane as described can exhibit a coulombic efficiency (CE) of about 90% or greater, for instance from about 93% to about 99% in some embodiments; an energy efficiency (EE) of about 75% or more, for instance from about 78% to about 85% in some embodiments; and a voltage efficiency (VE) of about 80% or more, for instance from about 81% to about 87%. At a current density of 483 mA/cm$^2$ a redox flow battery as described can exhibit a CE of 90% or greater, for instance from about 94% to about 98% in some embodiments; an EE of about 65% or more, for instance from about 65% to about 75% in some embodiments; and a VE of about 65% or more, for instance from about 66% to about 77%.

The performance characteristics of the redox flow battery membranes are based on the use of PBI gel membranes. Batteries and battery cells that incorporate the membranes are much improved as compared to those incorporating ion exchange membranes based upon conventional PBI polymer membranes, which exhibit very low ionic conductivities, e.g., less than 20 mS/cm. Moreover, batteries that incorporate conventional PBI polymer membranes are unable to function at current densities above about 80 mA/cm². Without wishing to be bound to any particular theory, it is believed that the excellent characteristics of the disclosed redox flow battery membranes are due to the morphology of the polymeric matrix that forms the membrane structure. As described further herein, the disclosed gel membranes are formed according to a method that includes hydrolysis of the PPA polymer solvent and the subsequent solidification of the PBI polymer in the hydrolysis product (PA). It is believed that this in situ hydrolysis and polymer solidification leads to formation of an ordered polymeric matrix that differs in molecular structure from the traditional, organic solution-cast PBI membranes that are cast as a solution of an organic solvent followed by solidification by removal of the organic solvent via, e.g., heating. In particular, it is believed that the PBI gel membrane structure includes a more open and ordered framework as compared to traditional PBI membranes, with the framework of the PBI matrix providing a stable gel membrane that exhibits the improved electrochemical properties as described.

In addition to highly desirable electrochemical characteristics, the redox flow battery membranes based on PBI polymers are highly resistant to degradation in the redox flow battery environment. For instance, disclosed membranes can show little or no degradation in oxidative vanadium solutions. As such, disclosed membranes can provide long-term activity, further reducing costs of redox flow batteries that incorporate the membranes.

To form a PBI gel membrane for use as a redox flow battery membrane, a polymerization composition can be formed that includes a PPA and the PBI-forming compounds of choice, e.g., PBI-forming monomers. The monomer content of the polymerization composition can generally be low, for instance about 10 wt. % or less, about 8 wt. % or less, or about 5 wt. % or less in some embodiments.

The PBI polymer of the PBI gel membrane can have any PBI structure as is generally known in the art and can be formed by polymerization of PBI-forming compounds including at least one aromatic or heteroaromatic tetraamino compound and at least one aromatic or heteroaromatic polycarboxylic acid or ester, anhydride, or acid chloride thereof or at least one aromatic or heteroaromatic diaminocarboxylic acid. Heteroaromatic compounds encompassed herein include aromatic systems that contain at least one nitrogen, oxygen, sulfur or phosphorus atom in an aromatic ring.

Examples of aromatic and heteroaromatic tetraamino compounds as may be utilized in forming the PBI gel membrane can include, without limitation, 2,3,5,6-tetraminopyridine; 3,3',4,4'-tetraminodiphenylsulfone; 3,3',4,4'-tetraminodiphenyl ether; 3,3',4,4'-tetraminobiphenyl; 1,2,4,5-tetraminobenzene; 3,3',4,4'-tetraminobenzophenone; 3,3',4,4'-tetraminodiphenylmethane; and 3,3',4,4'-tetraminodiphenyldimethyl-methane and the salts thereof, e.g., the mono-, di-, tri- and tetrahydrochloride salts, as well as any combination of aromatic or heteroaromatic tetraamino monomers.

In one embodiment, an aromatic polycarboxylic acid can include a dicarboxylic acid. A dicarboxylic acid can be utilized alone or in combination with one or more additional polycarboxylic acid compounds, e.g., tricarboxylic acids and/or tetracarboxylic acids. When incorporated, the content of tricarboxylic acid or tetracarboxylic acids can generally be about 30 mol % or less, for instance from about 0.1 mol % to about 20 mol %, or from about 0.5 mol % to about 10 mol % based on the amount of one or more dicarboxylic acid compounds. An ester of a polycarboxylic acid can be utilized such as C1-C20-alkyl esters or C5-C12-aryl esters of a polycarboxylic acid. An anhydride of a polycarboxylic acid or an acid chloride of a polycarboxylic acid can be polymerized according to disclosed methods.

Examples of aromatic dicarboxylic acids can include, without limitation, pyridine-2,5-dicarboxylic acid; pyridine-3,5-dicarboxylic acid; pyridine-2,6-dicarboxylic acid; pyridine-2,4-dicarboxylic acid; 4-phenyl-2,5-pyridinedicarboxylic acid; 3,5-pyrazoledicarboxylic acid; 2,6-pyrimidinedicarboxylic acid; 2,5-pyrazinedicarboxylic acid; 2,4,6-pyridinetricarboxylic acid; benzimidazole-5,6-dicarboxylic acid; 5-hydroxyisophthalic acid; 4-hydroxyisophthalic acid; 2-hydroxyterephthalic acid; 5-aminoisophthalic acid; 5-N, N-dimethylaminoisophthalic acid; 5-N,N-diethylaminoisophthalic acid; 2,5-dihydroxyterephthalic acid; 2,6-dihydroxyisophthalic acid; 4,6-dihydroxyisophthalic acid; 2,3-dihydroxyphthalic acid; 2,4-dihydroxyphthalic acid; 3,4-dihydroxyphthalic acid; 1,8-dihydroxynaphthalene-3,6-dicarboxylic acid; diphenylsulfone-4,4'-dicarboxylic acid; isophthalic acid; terephthalic acid; phthalic acid; 3-fluorophthalic acid; 5-fluoroisophthalic acid; 2-fluoroterephthalic acid, tetrafluorophthalic acid, tetrafluoroisophthalic acid, tetrafluoroterephthalic acid; 3-sulfophthalic acid; 5-sulfoisophthalic acid; 2-sulfoterephthalic acid; tetrasulfophthalic acid; tetrasulfoisophthalic acid; tetrasulfoterephthalic acid; 1,4-naphthalenedicarboxylic acid; 1,5-naphthalenedicarboxylic acid; 2,6-naphthalenedicarboxylic acid; 2,7-naphthalenedicarboxylic acid; diphenic acid; diphenyl ether 4,4'-dicarboxylic acid; benzophenone-4,4'-dicarboxylic acid; biphenyl-4,4'-dicarboxylic acid; 4-trifluoromethylphthalic acid; 2,2-bis(4-carboxyphenyl)hexafluoropropane; 4,4'-stilbenedicarboxylic acid; and 4-carboxycinnamic acid or any combination thereof.

Examples of aromatic tricarboxylic acids and esters, acid anhydrides, and acid chlorides thereof can include, without limitation, 1,3,5-benzenetricarboxylic acid (trimesic acid); 1,2,4-benzenetricarboxylic acid (trimellitic acid); (2-carboxyphenyl)iminodiacetic acid; 3,5,3'-biphenyltricarboxylic acid; and 3,5,4'-biphenyltricarboxylic acid; or any combination thereof.

Examples of aromatic tetracarboxylic acids and esters, acid anhydrides, and acid chlorides thereof can include, without limitation, 3,5,3',5'-biphenyltetracarboxylic acid; benzene-1,2,4,5-tetracarboxylic acid; benzophenonetetracarboxylic acid; 3,3',4,4'-biphenyltetracarboxylic acid; 2,2',3,3'-biphenyltetracarboxylic acid; 1,2,5,6-naphthalenetetracarboxylic acid; and 1,4,5,8-naphthalenetetracarboxylic acid; or any combination thereof.

Heteroaromatic carboxylic acids can include heteroaromatic dicarboxylic acids, heteroaromatic tricarboxylic acids and heteroaromatic tetracarboxylic acids, including their respective esters such as C1-C20-alkyl esters, C5-C12-aryl esters, or the acid anhydrides or the acid chlorides of the heteroaromatic carboxylic acids. Examples of heteroaromatic carboxylic acids include, without limitation, pyridine-2,5-dicarboxylic acid; pyridine-3,5-dicarboxylic acid; pyridine-2,6-dicarboxylic acid; pyridine-2,4-dicarboxylic acid; 4-phenyl-2,5-pyridinedicarboxylic acid; 3,5-pyrazoledicarboxylic acid; 2,6-pyrimidinedicarboxylic acid; 2,5-pyrazinedicarboxylic acid; 2,4,6-pyridinetricarboxylic acid; benzimidazole-5,6-dicarboxylic acid; and also their C1-C20-alkyl esters or their C5-C12-aryl esters; or their acid anhydrides or their acid chlorides; or any combination thereof.

In one embodiment, the polymerization composition can include a diaminocarboxylic acid, examples of which include, without limitation, diaminobenzoic acid and the mono and dihydrochloride derivatives of said acid, as well as 1,2-diamino-3'-carboxy acid 4,4'-diphenyl ether, or any combination thereof.

PPA as can be utilized in the polymerization composition can be commercial PPA as obtainable, for example, from Riedel-de Haen. PPA can include concentrated grades of PA ($H_3PO_4$) above 100%. At high concentrations, the individual $H_3PO_4$ units are polymerized by dehydration and the PPA can be expressed by the formula $H_{n+2}P_nO_{3n+1}$ (n>1).

The PPA [$H_{n+2}P_nO_{3n+1}$ (n>1)] can have a $P_2O_5$ content as calculated by acidimetry of about 70 wt. % or more, for instance about 75 wt. % or more, or about 82 wt. % or more, for instance from about 70 wt. % to about 86 wt. % in some embodiments. The polymerization composition can be in the form of a solution of the monomers/compounds, or a dispersion/suspension of the monomers/compounds in the PPA, generally depending upon the nature of the compounds to be polymerized and any additional components of the polymerization solution.

The polymerization can be carried out at a temperature and for a time until suitable polymerization of the compounds has taken place, which can generally be determined by an increase in viscosity of the polymerization composition. The increase in viscosity can be determined by visual inspection, through determination of the intrinsic viscosity, or by any other suitable means. For instance, the polymerization can continue until the polymerization composition exhibits an intrinsic viscosity of about 0.8 dl/g or greater, for instance about 1.0 dL/g or greater, or about 1.5 dL/g or greater, in some embodiments. The polymerization temperature can generally be about 220° C. or less, for instance about 200° C. or less, such as about 100° C. to 195° C. in some embodiments. The polymerization can be carried out over a time of from a few minutes (e.g., about 5 minutes) up to several hours (e.g., about 100 hours). In one embodiment, the polymerization composition can be heated in a stepwise fashion, for instance in three or more steps, each step lasting from about 10 minutes to about 5 hours and increasing the temperature by about 15° C. or more for each step. Of course, the particular polymerization conditions can be varied, depending generally upon the reactivity and concentration of the particular monomers, as would be evident to one of skill in the art, and no particular polymerization conditions are required in formation of the redox flow battery membranes.

Exemplary PBI polymer repeating units of a PBI gel membrane can include, without limitation:

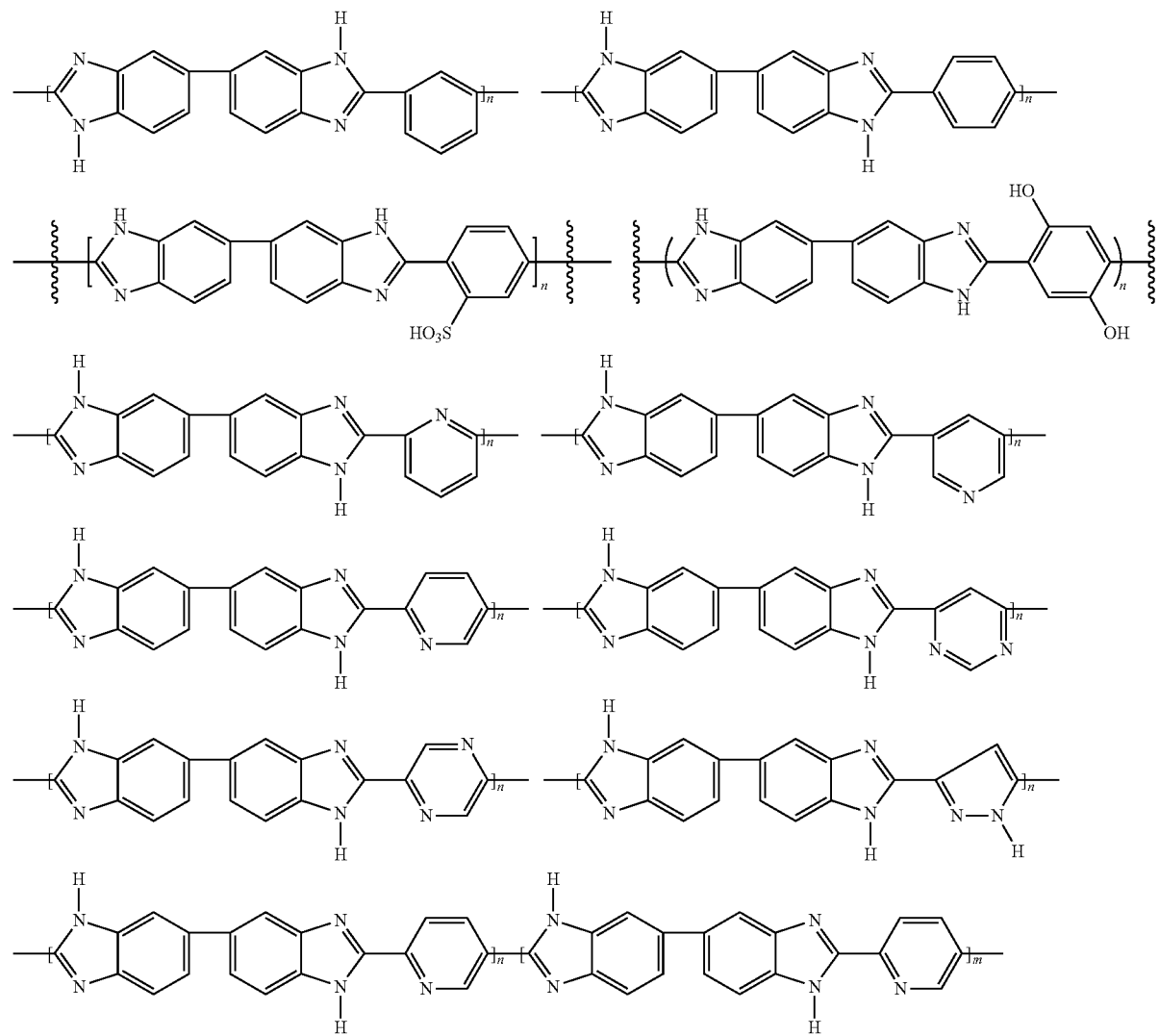

-continued
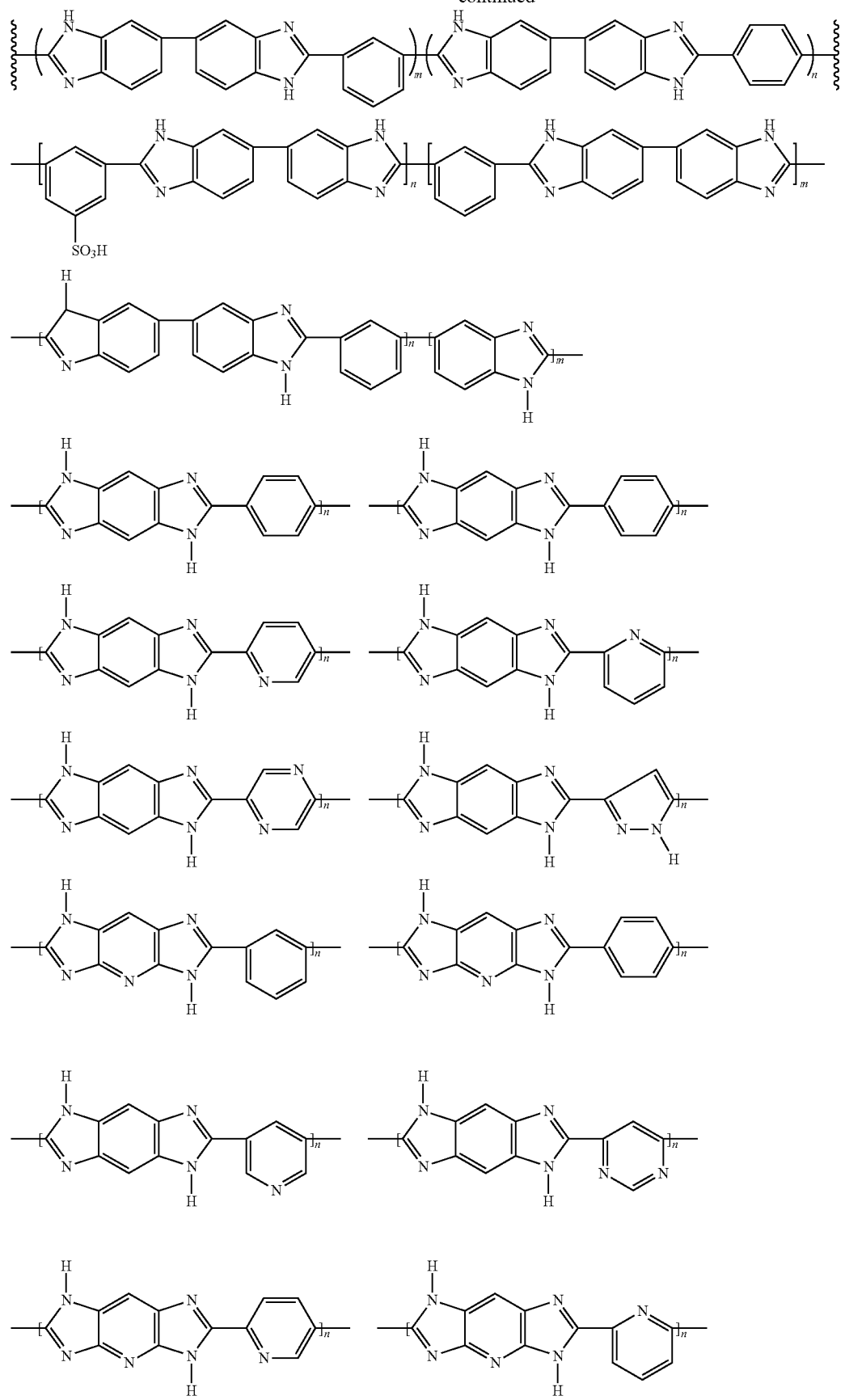

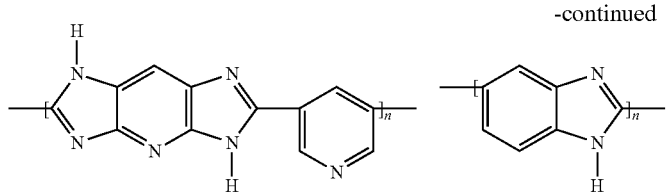

or any combination thereof, in which n and m are each independently 1 or greater, about 10 or greater, or about 100 or greater, in some embodiments.

A PBI polymer of a membrane as disclosed herein can include any repeating unit including any derivatization thereof as is generally known in the art, examples of which are well within the knowledge of one of skill in the art, representative examples of which have been described, for instance in US Patent Application Publication No. 2013/0183603 to Benicewicz, et al., which is incorporated by reference herein.

Following polymerization, the polymer can be in solution in the PPA solvent, and the PBI polymer solution can be processed to form a gel membrane precursor having a desired thickness. Beneficially, the polymer solution, as well as the gel membrane precursor and eventual gel membrane and redox flow battery membrane formed of the polymer solution, can be free of organic solvents.

The membrane precursor can be formed according to any suitable formation process, such as, and without limitation to, casting, spray coating, knife coating, etc. For instance, the gel membrane precursor can be formed to a thickness of from about 20 micrometers (μm) to about 4,000 μm in one embodiment, such as from about 30 μm to about 3,500 μm, or from about 50 μm to about 1,000 μm, in some embodiments.

To solidify the polymer and form the PBI gel membrane, the PBI polymer solution can be treated in the presence of water and/or moisture to hydrolyze at least a portion of the PPA of the solution. Upon hydrolysis, the PPA will hydrolyze to form PA and water, thereby causing a sol-gel transfer of the PBI polymer solution and solidification of the polymer, as the PBI polymer is less soluble in PA as compared to PPA.

The hydrolysis treatment can be carried out at temperatures and for a time sufficient for the gel membrane to solidify so as to be self-supporting and capable of being manipulated without destruction while incorporating high liquid content (e.g., about 60 wt. % or higher liquid content of the total solid and liquid content of the membrane). By way of example, the hydrolysis treatment can be carried out at a temperature of from about 0° C. to about 150° C., for instance from about 10° C. to about 120° C., or from about 20° C. to about 90° C., e.g., at ambient temperature in some embodiments (e.g., at a relative humidity contacting environment of from about 35% to 100%).

The hydrolysis can be carried out by contact of the gel membrane precursor with $H_2O$, for instance in the form of a liquid or vapor, and/or in the presence of other components. For instance, the gel membrane precursor can be contacted with water vapor and/or liquid water and/or steam and/or aqueous PA (e.g., a PA solution having a PA concentration of from about 10 wt. % to about 90 wt. %, e.g., about 30 wt. % to about 70 wt. % or about 45 wt. % to about 55 wt. %). The treatment can be carried out under standard pressure, but this is not a requirement of a formation process, and in some embodiments, the hydrolysis treatment can be carried out under a modified pressure.

In one embodiment, the hydrolysis can be carried out in a climate-controlled environment in which the $H_2O$ content can be tightly controlled. For example, the moisture content of the local environment can be controlled through control of the temperature or saturation of the fluid contacting the precursor membrane. For example, carrier gases such as air, nitrogen, carbon dioxide or other suitable gases can carry $H_2O$, e.g., steam, in a controlled amount for contact with the precursor membrane.

The hydrolysis treatment time can generally vary depending upon parameters such as, e.g., $H_2O$ content and form of the contact, membrane thickness, contact temperature, etc. In general, the hydrolysis treatment can be carried out in a time period of between a few seconds to a few minutes, for instance when the hydrolysis treatment utilizes superheated steam, or alternatively over a period of several days, for example when the hydrolysis treatment is carried out at ambient temperature and low relative atmospheric moisture. In some embodiments, the hydrolysis treatment can be carried out over a period of time between about 10 seconds and about 300 hours, for instance from about 1 minute to about 200 hours. By way of example, in an embodiment in which the at least partial hydrolysis of the PPA of the PBI polymer solution is carried out at room temperature (e.g., about 20° C.) with ambient air of relative atmospheric moisture (i.e., relative humidity) content of from about 20% to 100%, for instance from about 40% to about 80%, the treatment time can generally be between about 5 hours and about 200 hours.

Upon hydrolysis of at least a portion of the PPA of the PBI polymer solution, the polymer can solidify, which form the PBI gel membrane. The PBI gel membrane can in one embodiment have a thickness of from about 15 μm to about 3000 μm, for instance from about 20 μm to about 2000 μm, or from about 20 μm to about 1500 μm, though any particular membrane thickness is not critical. In some embodiments, the PBI gel membrane can have a thickness that is less than that of the membrane precursor. As previously discussed, following hydrolysis, the PBI gel membrane can be self-supporting, even at high liquid content, which is believed to be due to the intra- and intermolecular polymer structures present in the solidified polymeric matrix.

The as-formed PBI gel membrane can in one embodiment have PBI solids content of from about 5 wt. % to about 40 wt. %, for instance from about 8 wt. % to about 30 wt. %, or from about 10 wt. % to about 25 wt. % of the total weight of the membrane including liquid content. The as-formed PBI gel membrane can be self-supporting, for instance having a Young's modulus of about 2.0 MPa or greater, for instance about 3.0 MPa or greater, or about 4.5 MPa or greater in some embodiments as determined for a PBI gel membrane having a thickness of 0.43 mm and a PBI content of 5 wt. % (e.g., polybenzimidazole).

To form the redox flow battery membrane from the PBI gel membrane, the PA and any remaining PPA incorporated in the membrane can be removed and replaced with a redox flow battery supporting electrolyte. For instance, the PBI gel membrane can be simply washed with water several times to remove any PA and PPA remaining in the gel membrane. For example, the PBI gel membrane can be soaked in a series of water baths, each bath retaining the PBI gel membrane for a period of time from a few minutes (e.g., about 5 minutes) to several hours (e.g., about 24 hours). Optionally, the baths can be heated, for instance to a temperature of from about 20° C. to about 150° C., for instance from about 25° C. to about 90° C., though in other embodiments, the membrane can be rinsed at ambient temperature, with no particular temperature control. To confirm removal of the PA and PPA, the pH of the wash solution can be determined and washing/rinsing can continue until the pH of the wash solution is neutral.

Optionally, the PBI gel membrane can be crosslinked, which can decrease the permeability of the membrane to redox pair ions of the battery electrolyte solutions without strongly affecting the desirable electrochemical characteristics of the membranes. The manner of crosslinking, as well as the point in the formation process at which the membrane is crosslinked, is not particularly limited. For instance, the gel membrane can be crosslinked following rinsing/washing of the as-formed gel membrane and prior to imbibing of the membrane with a supporting electrolyte. In other embodiments, however, the membrane can be crosslinked prior to rinsing/washing or following imbibing of the membrane with the supporting electrolyte.

In one embodiment, the PBI gel membrane can be crosslinked simply by heating in the presence of atmospheric oxygen. Crosslinking can also be effected by the action of radiation, e.g., infrared (IR) radiation (having a wavelength of from about 700 nm to about 1 mm) including near IR (radiation having a wavelength of from about 700 to about 2000 nm or an energy in the range from about 0.6 to about 1.75 eV).

To effect crosslinking, the PBI polymer can incorporate reactive functionality on the polymer chains so as to crosslink with itself or alternatively in conjunction with a crosslinking agent, i.e., a polyfunctional compound that can react with one or more functionalities of the PBI polymer (e.g., amines). Crosslinking agents can include any suitable functionality to effect crosslinking. Suitable crosslinking agents are not particularly limited, examples of which can include, without limitation, epichlorohydrin, diepoxides, diisocyanates, α,ω-dihaloalkanes, diacrylates, and bisacrylamides, particular examples of which can include, without limitation, α,α'-dichloro-p-xylene, chloromethyl methyl ether, bis(chloromethyl) ether, terephthaloyl chloride, succinyl chloride, and dimethyl succinate, as well as combinations of crosslinking agents. In one embodiment, from 1 to 20 equivalents of crosslinking agent can be utilized per available aromatic ring, but crosslinked embodiments of the membranes are not limited to any particular crosslink density.

To form the redox flow battery membrane, the gel membrane can be imbibed with a supporting electrolyte. The supporting electrolyte of choice can generally depend upon the particular characteristics of the redox flow battery in which the membrane is to be employed, and can include acidic supporting electrolytes, basic supporting electrolytes, as well as neutral species (e.g., water). For instance, the membrane can be imbibed with a mineral acid (e.g., a strong inorganic acid) such as hydrochloric acid, nitric acid, fluorosulfonic acid, or sulfuric acid, or a mixture thereof, or a strong organic acid such as acetic acid, formic acid, p-toluene sulfonic acid, or trifluoromethane sulfonic acid or mixtures thereof, as well as mixtures of different types of acids, e.g., a combination of a mineral acid and an organic acid. Other examples of supporting electrolytes that can be imbibed in the membrane can include, without limitation, sodium chloride, potassium chloride, sodium hydroxide, potassium hydroxide, sodium sulfide, potassium sulfide, and combinations thereof. By way of example, a supporting electrolyte can include $H_2SO_4$, HBr, HBr/HCl mixtures, HCl, $NaS_2$, $NaS_2$/NaBr mixtures, $Br_2$ in HBr, $Br_2$ in $H_2SO_4$, $Br_2$ in HBr/$H_2SO_4$ mixtures, etc. Tetraalkylammonium supporting cations can be imbibed in the membranes in one embodiment, with $Et_4N^+$ and $Bu_4N^+$ being two non-limiting examples. A solution of a tetrafluoroborate ($BF^{4-}$), perchlorate ($ClO^{4-}$), or hexafluorophosphate ($PF^{6-}$), or a combination thereof are additional examples of supporting electrolytes that can be imbibed in the membranes.

The concentration of the supporting electrolyte in the membrane is not particularly limited, and in general a solution that is imbibed in the membranes can include the supporting electrolyte in a concentration of up to about 25 moles/liter (M), for instance from about 0.1 M to about 25 M, from about 0.5 M to about 10 M, or from about 1 M to about 5 M in some embodiments.

The membrane can be imbibed with the supporting electrolyte according to any suitable methodology. For example, the membrane can be imbibed with the supporting electrolyte in one embodiment by soaking the membrane in a solution of the supporting electrolyte for a period of time from a few minutes up to hours or days, optionally in an environment of increased temperature.

A redox flow battery membrane can include one or more additives that can be incorporated in the membrane at the time of membrane formation or in conjunction with the supporting electrolyte. By way of example, an organic small molecule, such as small C1-C4 alcohols (e.g., glycerol), small organic acids, urea, etc. can be incorporated in the redox flow battery in conjunction with the supporting electrolyte.

In one embodiment, a redox flow battery membrane can incorporate a particulate, e.g., a titanium dioxide or a PBI particulate, generally in an amount of about 2 wt. % or less, which can decrease the porosity of the membranes. For instance, nano-sized particulates of PBI can be incorporated into the polymeric matrix during solidification of the gel-membrane by addition of the particulate to the polymer solution prior to or during hydrolysis.

A redox flow battery membrane including a PBI gel membrane and a supporting electrolyte can be incorporated in a redox flow battery for any use and in conjunction with any suitable electrolyte solutions and redox pairs. For instance, redox flow battery membranes as described can be incorporated in batteries for use in the renewable energy sector and/or in current power grids for backup/reducing energy interruption during peak usage times.

On embodiment of a redox flow battery cell 10 that can incorporate a redox flow battery membrane 12 as described herein is illustrated in FIG. 1. As shown, the cell can be in liquid communication with a first tank 100 that can retain a first electrolyte solution and a second tank 200 that can retain a second electrolyte solution. The tanks 100, 200 can be in liquid communication with either side of a redox flow battery membrane 12 of the cell 10 by use of conduits 110, 210, pumps 112, 212, valves, control systems, etc. The electrolyte solutions stored in the tanks 100, 200 can be circulated into either side of the cell 10 to contact either side of the membrane 12 by pumps 112 and 212, respectively, during charging and discharging.

The electrolyte solutions of a battery can each incorporate one member of a redox pair, as is known. In one particular embodiment, a redox flow battery membrane can be utilized in VRB, as is known in the art. A VRB includes in a first electrolyte solution a vanadium-based compound in which the vanadium alternates between a +5-valent (pentavalent) and a +4-valent (tetravalent) vanadium such as, for example, $(VO_2)_2SO_4$, $VO(SO_4)$, or a combination thereof. The second electrolyte solution can include as active material vanadium-based compound in which the vanadium alternates between a +2-valent (divalent) to +3-valent (trivalent) vanadium, such as, for example, $VSO_4$, $V_2(SO_4)_3$, or a combination thereof.

The charge/discharge chemical reactions a VRB can be represented in one embodiment as:

Positive Electrode:

$$VO^{2+}+H_2O-e^-\rightarrow VO_2^++2H^+ \quad \text{(charge)}$$

$$VO^{2+}+H_2O-e^-\leftarrow VO_2^++2H^+ \quad \text{(discharge)}$$

$E^0$=+1.00 V vs. standard hydrogen electrode (SHE)
Negative Electrode $$V^{3+}+e^-\rightarrow V^{2+} \quad \text{(charge)}$$

$$V^{3+}+e^-\leftarrow V^{2+} \quad \text{(discharge)}$$

$E^0$=−0.26 V vs. SHE
Overall Chemical Reaction:

$$VO^{2+}+V^{3+}+H_2O\rightarrow VO_2^++2H^++V^{2+} \quad \text{(charge)}$$

$$VO^{2+}+V^{3+}+H_2O\leftarrow VO_2^++2H^++V^{2+} \quad \text{(discharge)}$$

$E^0_{cell}$=1.26 V vs. SHE

Of course, the redox flow batteries described herein are not limited to VRB, and other batteries including other redox pairs are encompassed herein. Exemplary redox pairs can include, without limitation, $Zn/Br_2$; Zn/Fe; Fe/Cr polysulfide/$Br_2$; polysulfide/I2; 9,10-anthraquinone-2,7-disulphonic acid (AQDS)/$Br_2$; Poly(methyl viologen) (poly(MV))/poly(2,2,6,6-tetramethylpipendinyloxy-4-yl methacrylate) (poly(TEMPO)); bis-(trimethylammonio)propyl vionlogen tetrachloride (BTMAP-Vi)/BTMAP-ferrocene dichloride (BTMAP-Fc); 2,6-dihydroxyanthraquinone (2,6-DHAQ)/ferrocyanide; and alloxazine7/8-carboxylic acid (ACA)/ferrocyanide.

By way of example, in one embodiment a battery can include an electrolyte system that includes as an active anolyte material a ferrocyanide such as $[Fe(CN)_6]_3$/$[Fe(CN)_6]_4$ and as an active catholyte material $Fe^{2+}$ and $Fe^{3+}$. The catholyte in such a system can include an iron/ligand complex, examples of which can include, without limitation, triethanolamine, diethanolamine, ethanolamine, N, N-bis-(2-hydroxyethyl)-(iminotris)-(hydroxymethyl)-methane, and mixtures thereof in which the catholyte may have a ligand-to-iron ratio of from about 3:1 to about 10:1.

The electrolyte solutions can generally include the active material (e.g., vanadium ion, iron ion, etc.) in a concentration of from about 0.5 M to about 10 M. For instance, an electrolyte solution can include an active material in a concentration of at about 0.5M or more, about 0.6M or more, or about 0.7M or more, for instance from about 1 M to about 3 M.

In one embodiment, the electrolyte solutions can include the respective active material at a concentration of the active material in a range from 1M to 10M. In one embodiment, when the active material has a concentration within this range, it can encourage the high-energy density and high-power density under which the redox flow battery membranes are capable of operating. In one embodiment, when the active material has a concentration of less than 1 M, the active material included in the liquid can be too little of an amount per unit volume, thereby decreasing energy density. In one embodiment, when the active material has a concentration of more than 10 M, the electrolyte solution can have a sharply increased viscosity and thus, a remarkably decreased oxidation/reduction reaction speed, thereby decreasing power density. The paired electrolyte solutions of a redox flow battery can include their respective redox pair active materials in the same concentration as one another or in different concentrations, with the preferred concentrations generally depending upon the particular redox pair to be utilized, the application of the battery, and the presence of any additional additives in the electrolyte solutions.

The electrolyte solutions of a battery can include additives, such as one or more redox flow battery supporting electrolytes as discussed previously. In one embodiment, the electrolyte solutions of a battery can include the supporting electrolyte that has been imbibed in the redox flow battery membrane.

An electrolyte solution can include a sulfuric acid supporting electrolyte in one embodiment. For instance, an electrolyte solution can include a mixture of sulfuric acid and water, that is, a sulfuric acid aqueous solution, in conjunction with the active material of the solution, for instance as a solvent. In one embodiment, a mixture of a supporting electrolyte and water, e.g., a sulfuric acid aqueous solution, can include a supporting electrolyte in a concentration of from about 1 M to about 5 M. The concentration of the supporting electrolyte can be selected in one embodiment so as to provide suitable solubility for the active material of the electrolyte solution. As such, the solution can exhibit desirable ion conductivity and viscosity and can avoid creating an overvoltage issue in the battery.

As indicated in FIG. 1, each side of a cell 10 can include additional components adjacent the membrane 12 as are known in the art including a conductive separator 14, e.g., a porous carbon paper, carbon cloth, carbon felt, or metal cloth (a porous film made of fiber-type metal or a metal film formed on the surface of a polymer fiber cloth), among others. The cell can also include electrodes 16, as are known, which may be the same or different from one another and may be made of a conductive substrate appropriate for the respective electrolyte solution of the cell (e.g., graphite). Current collectors 18 (e.g., gold-plated copper) can be in electrical communication with the electrodes 16, and a cell can include end plates 20 (e.g., stainless steel end plates), one on either side of the ½ cell, and facing oppositely away from a separator. The current collectors 18 provide electrical communication between the cell 10 and an exterior circuit, as shown.

Figure 2:
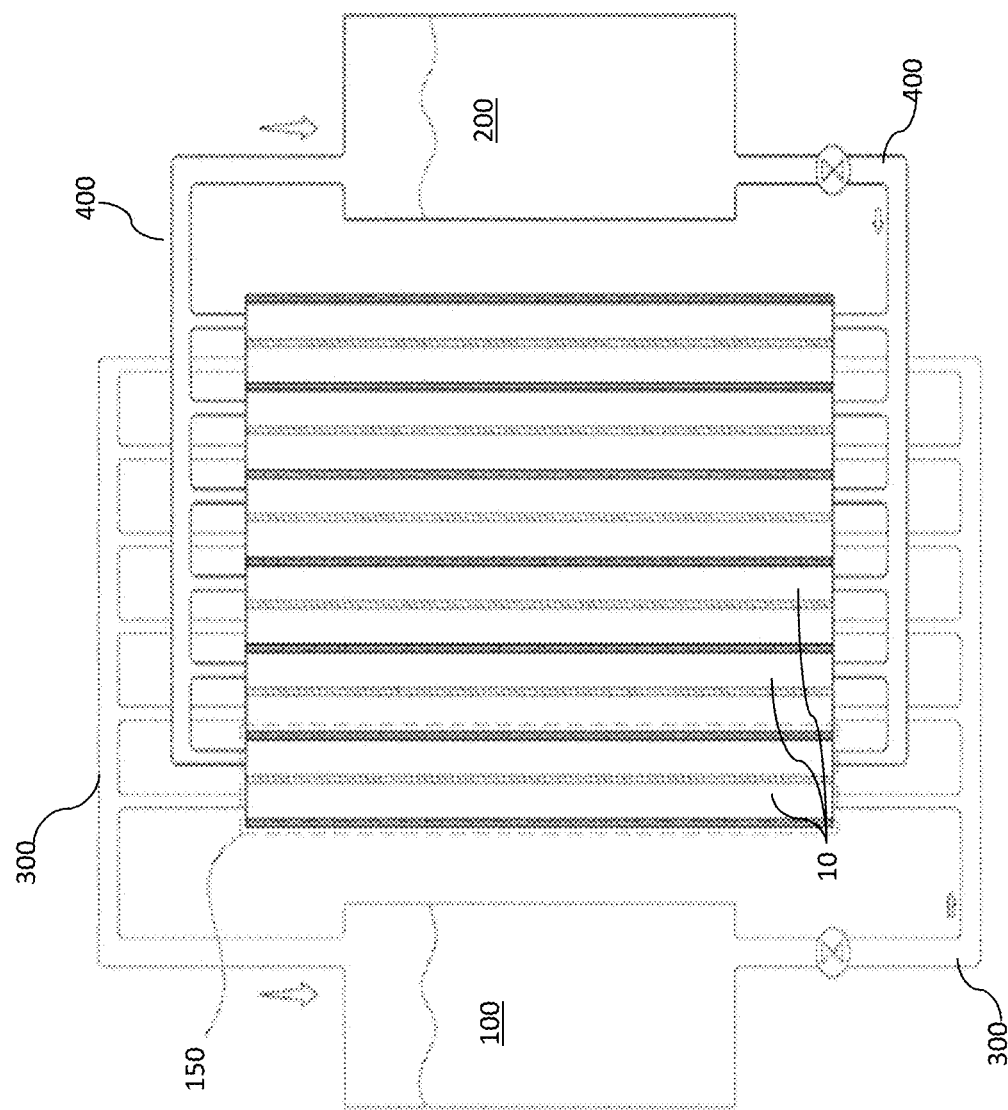
FIG. 2 schematically illustrates a multi-cell stack as may be included in a redox flow battery as described.

FIG. 2 illustrates a plurality of cells 10 arranged in a typical cell stack 150 of a redox flow battery. As shown, a first circulation path 300 can pass through one side of each of the cells 10 of the stack 150 such that the electrolyte solution of this half of the battery flows through the path 300 and returns to the first tank 100. A second circulation path 400 passes through the other side of each of the cells 10 of the stack 150 such that the electrolyte solution of this half of the battery flows through the path 400 and returns to the second tank 200. As indicated in FIG. 1, a redox flow battery can further include respective charging/discharging circuits, as well as converters, controllers, etc. as are known in the art to collect and supply power by use of the battery.

Redox flow battery membranes as described herein can allow for higher performing flow batteries operating under high current loads. Such improved operating conditions can mitigate the need for large electrochemical stacks, and thereby can reduce the overall cost of commercial flow battery devices. Further, the membranes of the present invention exhibit superior performance due to high ionic conductivity. This, in-turn, can reduce the cost of the overall build by reducing the necessary stack size.

The present disclosure may be better understood with reference to the Examples set forth below.

Materials and Methods 3,3',4,4'-Tetraaminobiphenyl (TAB, polymer grade, ~97.5%) was donated by BASF Fuel Cell, Inc. and used as received. Additional monomers were purchased and used as received. PPA (115%) was supplied from FMC Corporation and used as received. α,α'-Dichloro-p-xylene (>98.0% purity) was purchased from TCI and used as received.

Polymer Synthesis and Membrane Fabrication

A typical polymerization included combination of the monomers and the PPA solvent, mixing with an overhead stirrer and purging with dry nitrogen. The contents of the reaction kettle were heated in a high temperature silicone oil bath, and the temperature was controlled by a programmable temperature controller with ramp and soak features. Once the reaction was complete, determined by visual inspection of viscosity, the polymer solution was cast onto clear glass plates using a doctor blade with a controlled gate thickness of 15 mils unless otherwise noted. The cast solution was hydrolyzed into membranes in a humidity chamber regulated to 55% relative humidity at 25° C.

Acid Exchange

As-cast membranes were placed in DI water baths, and the pH of the water was monitored using pH strips. Water baths were replaced every 8 hours until a pH of 7 was recorded. At this point, the membrane was either placed into a 2.6 M sulfuric acid bath for 24 hours to ensure equilibrium of acid doping, or the membrane was further modified by a crosslinking reaction.

Post-Membrane Formation Crosslinking

After PA removal from the PBI gel membranes they were allowed to soak in a bath of 0.0523 M solution of α,α'-dichloro-p-xylene in methanol. The bath was covered, heated to 30° C., and agitated with a magnetic stir bar. Crosslinking reactions were typically allowed to proceed for 6 hours. The membrane was then washed with DI water and methanol cyclically, at least three times. The membrane was then transferred to a 2.6 M sulfuric acid (SA) bath for 24 hours for acid doping.

Membrane Composition

The composition of sulfuric acid-doped PBI membranes was determined by measuring the relative amounts of polymer solids, water, and acid in the membranes. The sulfuric acid content of a membrane was determined by titrating a membrane sample with standardized sodium hydroxide solution (0.10 M) using a Metrohm 888 DMS Titrando autotitrator. Once titrated, the sample was thoroughly washed with DI water and dried at reduced pressures at 120° C. overnight. The dried sample was then weighed to determine the polymer solids content of the membrane.

Using equations 1 and 2, the polymer weight percentage and sulfuric acid weight percentage were determined, respectively;

$$\text{Polymer w/w \%} = \frac{W_{dry}}{W_{sample}} \cdot 100 \quad (1)$$

$$\text{Acid w/w \%} = \frac{M_{acid} \cdot V_{NaOH} \cdot C_{NaOH}}{2 \cdot W_{sample}} \quad (2)$$

where $W_{sample}$ is the weight of the sample before titration, $W_{dry}$ is the weight of final dried sample after titration, $M_{acid}$ is the molecular weight of sulfuric acid, and $V_{NaOH}$ and $c_{NaOH}$ are the volume and concentration of the sodium hydroxide solution required to neutralize the sulfuric acid to the first equivalence point. It is important to note that even though the second proton of sulfuric acid is much less acidic than the first, it is still a strong enough acid to cause both protons to be titrated simultaneously, $pK_{a1}=-3$ and $pK_{a2}=2$.

The number of moles of sulfuric acid per mole of PBI repeat unit (or the SA doping levels, X) were calculated from the equation:

$$X = \frac{V_{NaOH} \cdot C_{NaOH}}{2 \cdot W_{dry} / M_{polymer}} \quad (3)$$

where $V_{NaOH}$ and $c_{NaOH}$ are the volume and concentration of the sodium hydroxide solution required to neutralize the sulfuric acid to the first equivalence point, $W_{dry}$ is the final weight of the dried sample after titration, and $M_{polymer}$ is the molecular weight of the polymer repeat unit.

Conductivity

In-plane conductivity of the membrane was measured by a four-probe electrochemical impedance spectroscopy (EIS) method using a FuelCon (TrueData EIS PCM) electrochemical workstation over the frequency range from 1 Hz to 50 kHz. A membrane sample with a typical geometry of 1.0 cm×4.0 cm was fixed into the measuring 4-electrode head of the measurement. The conductivity of the membrane was calculated using the following equation:

$$\sigma = \frac{d}{l \cdot w \cdot R_m} \quad (4)$$

where d is the distance between the two inner probes, l is the thickness of the $P_{24}$, membrane, w is the width of the membrane, and $R_m$ is the ohmic resistance determined by the model fitting. Conductivities were conducted at room temperature, to replicate normal operating conditions of VRBs.

Vanadium Permeability

The crossover of vanadium(IV) was measured utilizing a PermeGear "side-by-side" direct permeation cell. The cell had two chambers with a 45 mL volume separated by the membrane under test. The temperature of the chambers was regulated at 25° C. with a recirculating water bath. A typical test experiment contained 1.5 M $VOSO_4$ in 2.6 M sulfuric acid in the donor chamber and 1.5 M $MgSO_4$ in 2.6 M sulfuric acid in the receptor chamber. Vanadium(IV) has a strong absorption characteristic at 248 nm; utilizing this property, the concentration of the receptor chamber was measured with a Shimadzu UV-2450 UV/Vis spectrometer at various time intervals. The $VO^{2+}$ permeability was calculated using Fick's diffusion law, equation 5, $$P_s t = \ln\left[1 - 2\frac{c_r(t)}{c_r(0)}\right]\left[-\frac{Vd}{A}\right] \quad (5)$$

where: $c_r(t)$ is the receptor VOSO$_4$ concentration at time t, $c_r(0)$ is the donor initial VOSO$_4$ concentration, V is the donor and receptor solution volume, d is the membrane thickness, A is the active area of the membrane, and $P_s$ is the salt permeability.

Vanadium Test Cell

A VRB test cell was assembled with an active area of 24 cm$^2$ and utilized interdigitated flow fields for liquid electrolyte solutions machined into carbon plates. During use, a membrane was sandwiched between identical commercial carbon paper electrodes that had been previously heat treated to 400° C. for 30 hours in air, and gasketed with polytetrafluoroethylene (PTFE) films. The cell was equipped with two reservoirs of 100 mL electrolyte solution per side consisting of 1.60 M vanadium species having 3.55 average oxidation state and 4.2 M total sulfur content. The electrolytes were circulated though the cell at a constant flow rate of 120 mL/min by two acid-resistant diaphragm pumps. The charge/discharge cycling performance was measured at constant current densities ranging from 72 mA/cm$^2$ to 484 mA/cm$^2$ using a multi-channel potentiostat (Model BT2000, Arbin Instruments Inc., College Station, Tex.).

Example 1

10.71 g TAB (50 mmol), and 13.44 g monosodium 2-sulfoterephthalate (s-TPA, 50 mmol) were added to 580 g PPA and polymerized as described above according to the following reaction scheme to form s-PBI:

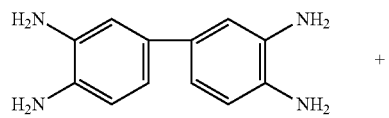

+

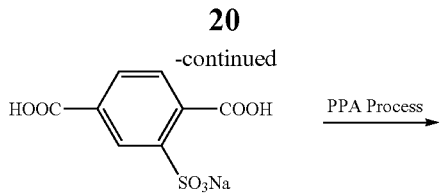

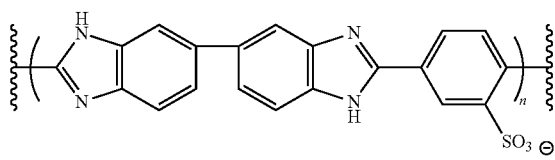

The polymerization was conducted for 48 hours in a nitrogen atmosphere at 220° C. The solution was applied by means of a doctor blade with a 15-mil gate thickness to a glass plate and subsequently hydrolyzed for more than 24 hours. The membrane was rinsed several times in deionized water baths to remove PA hydrolysis product. pH indication paper was used to ensure all the acid had been removed before proceeding.

A non-crosslinked membrane was formed in which a neutralized membrane was placed in a solution of 2.6 M sulfuric acid for 24 hours before characterization.

A crosslinked membrane was formed in which a neutralized membrane was submerged in a 0.0523 M solution of α,α'-dichloro-p-xylene in methanol and stirred for 6 hours at 30° C. The membrane was washed with deionized water followed by methanol four times, then once more in water. The crosslinked membrane was placed in a solution of 2.6 M sulfuric acid for 24 hours before characterization. The reaction scheme for the crosslinking reaction was as follows:

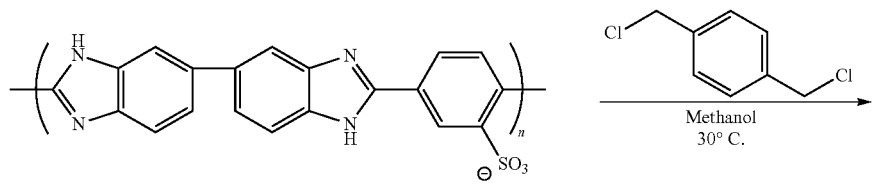

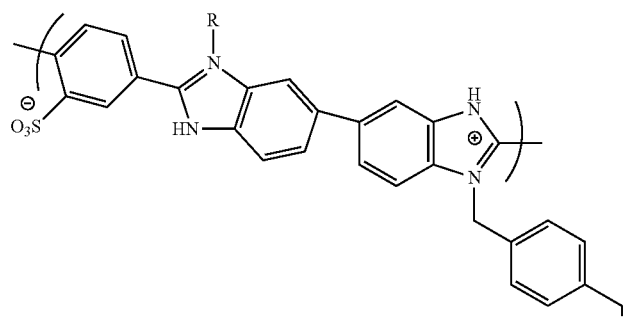

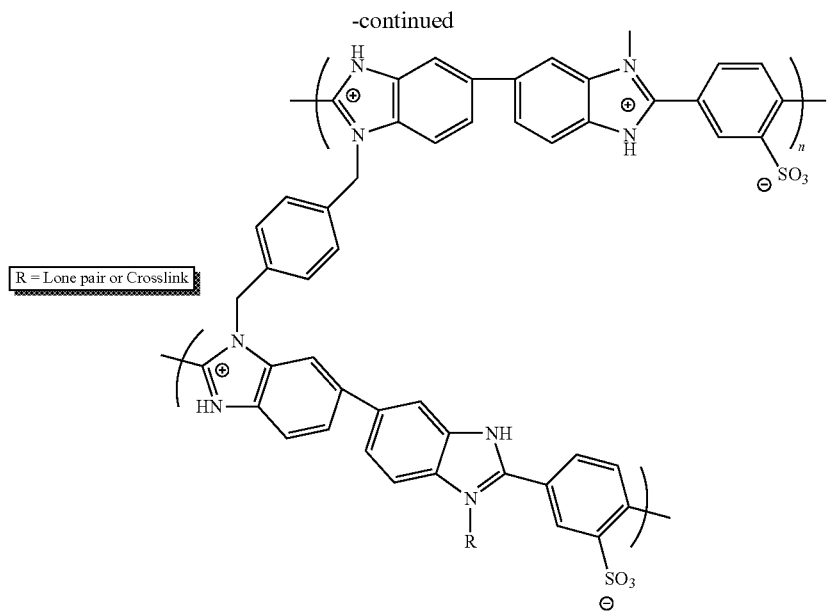

The room temperature ionic conductivity of the membranes was evaluated in both 2.6 M sulfuric acid and a V(IV)/H$^+$ solution found in typical operating cell conditions. The ex-situ membrane properties for the s-PBI gel membranes (both uncrosslinked and crosslinked) are shown in Table 1.

TABLE 1

| Membrane | VO$^{2+}$ Permeability (cm$^2 \cdot$ s$^{-1}$) | Conductivity (mS $\cdot$ cm$^{-1}$)$^a$ | Conductivity (mS $\cdot$ cm$^{-1}$)$^b$ | % Polymer Solids$^a$ | % Sulfuric Acid$^a$ | % Water$^a$ |
|---|---|---|---|---|---|---|
| s-PBI | 5.74 × 10$^{-7}$ | 593 | 242 | 18.8 | 23.11 | 58.1 |
| s-PBI-x | 5.23 × 10$^{-7}$ | 537 | 240 | 30.6 | 35.6 | 33.8 |

Figure 3:
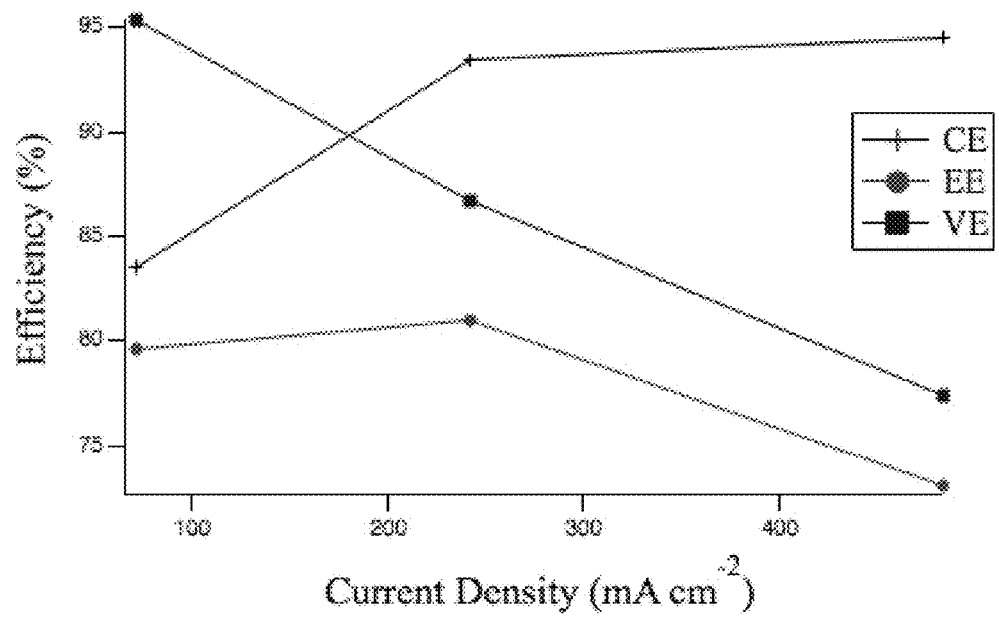
FIG. 3 presents the voltage efficiency (VE), the coulombic efficiency (CE) and the energy efficiency (EE) of a VRB incorporating a membrane as described herein.
Figure 4:
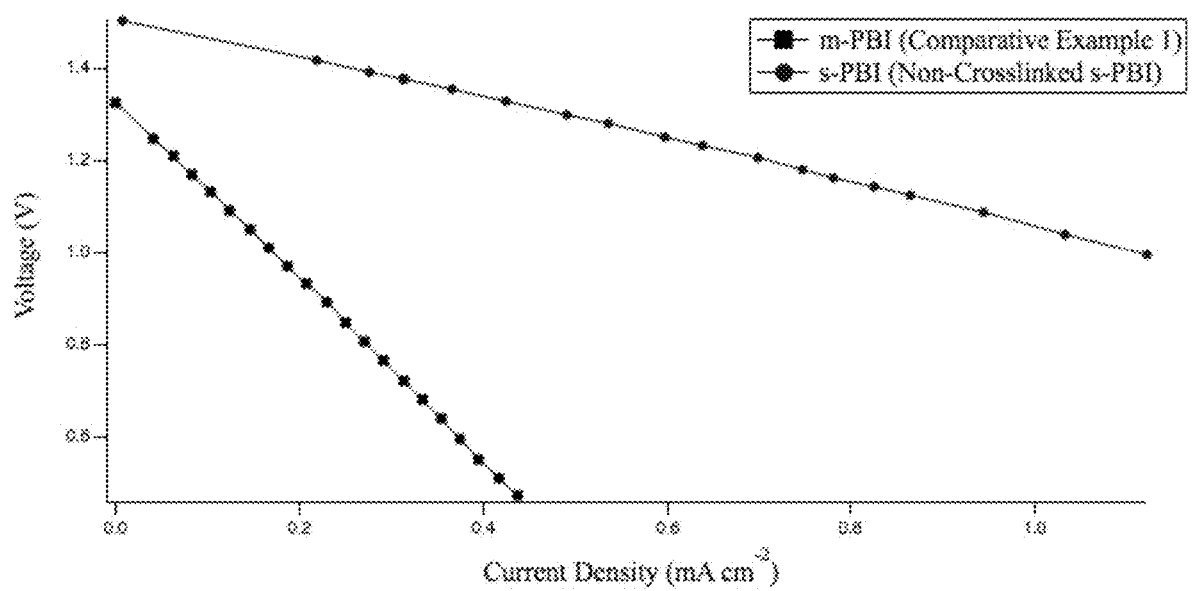
FIG. 4 presents the polarization curve for the VRB of FIG. 3 compared to a VRB incorporating a traditional PBI membrane.

$^a$After soaking in 2.6M sulfuric acid
$^b$After soaking in V(IV)/H$^+$ solution (1.5M VOSO$_4$ + 2.6M sulfuric acid) for 3 days A VRB test cell was assembled as described above including the non-crosslinked s-PBI membrane. The VE, CE. and EE were measured with results shown in FIG. 3 and Table 2, below. The polarization curve with 80% state-of-charge electrolyte and compared to m-PBI described in Comparative Example 1 is shown in FIG. 4.

TABLE 2

| Current Density (mA/cm$^2$) | C.E. (%) | E.E. (%) | V.E. (%) |
|---|---|---|---|
| 72 | 83.47 | 79.58 | 95.34 |
| 242 | 93.41 | 81.00 | 86.71 |
| 483 | 94.45 | 73.06 | 77.35 |

Figure 5:
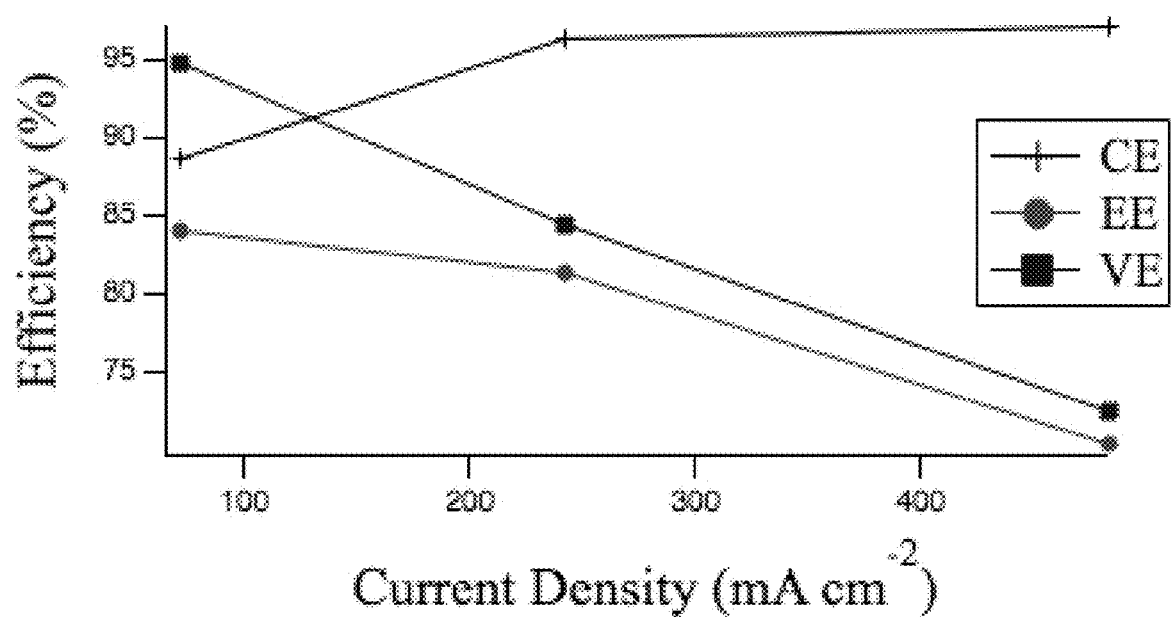
FIG. 5 presents the VE, the CE and the EE of a VRB incorporating a membrane as described herein.
Figure 6:
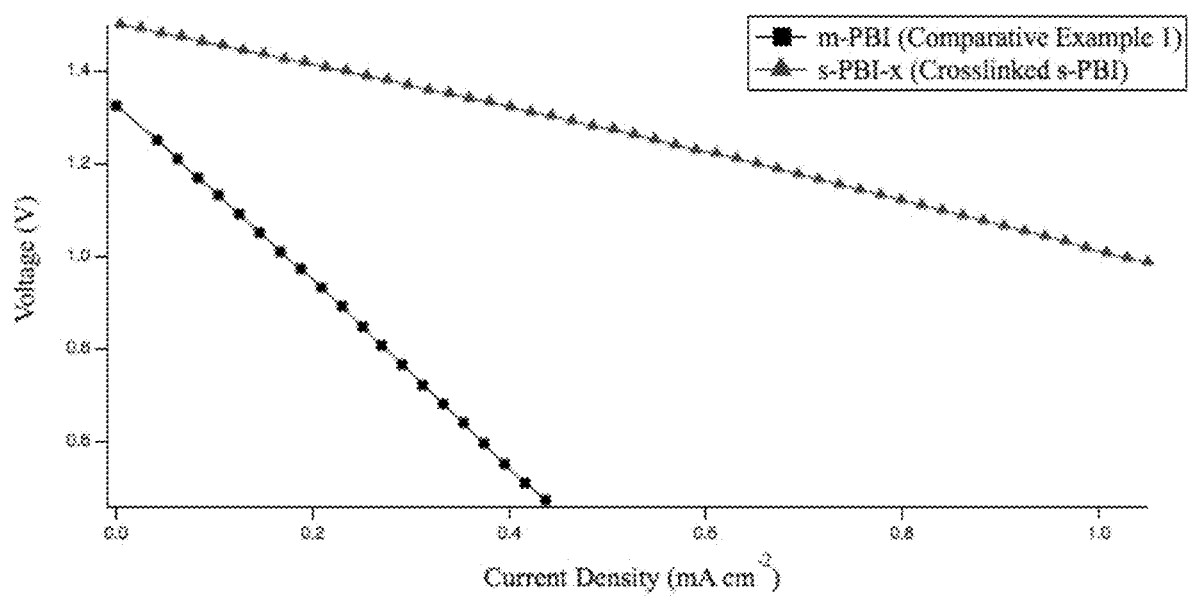
FIG. 6 presents the polarization curve for the VRB of FIG. 5 compared to a VRB incorporating a traditional PBI membrane.

Another VRB test cell was assembled as described above including the crosslinked s-PBI membrane. The VE, CE. and EE were measured and the results are shown in FIG. 5 and Table 3, below. The polarization curve with 80% state-of-charge electrolyte and compared to m-PBI described in Comparative Example 1 is shown in FIG. 6.

TABLE 3

| Current Density (mA/cm$^2$) | C.E. (%) | E.E. (%) | V.E. (%) |
|---|---|---|---|
| 72 | 88.69 | 84.11 | 94.80 |
| 242 | 96.30 | 81.42 | 84.49 |
| 483 | 97.00 | 70.51 | 72.55 |

The s-PBI gel membranes exhibit surprisingly high conductivities as compared to the m-PBI membranes in both sulfuric acid and the acid electrolyte solution (see Comparative Example 1); 537-593 mS·cm$^{-1}$ compared to 13.1 mS·cm$^{-1}$ and 240-242 mS·cm$^{-1}$ compared to 12.2 mS·cm$^{-1}$, respectively. The slight difference in conductivity between the two s-PBI membranes is likely a result of cross-linking. The crosslinker forms bonds with the imidazole nitrogen and may slightly inhibit a protons path through the hydrogen bond networks.

To confirm crosslinking occurred, a 50 mg samples of neutralized dried membranes were heated in 800 mL N,N'-dimethylacetamide at reflux for 48 hours. Under these conditions, no membrane deterioration or solution color change was observed for the crosslinked sample, but dissolution was observed for the pristine polymer film. Furthermore, the swell ratios of the crosslinked vs. non-crosslinked membranes afforded noteworthy results. Utilizing a non-acid solvent (N,N'-dimethylacetamide), to ensure that unwanted solvent polymer interactions were suppressed, it was found that the non-crosslinked PPA-formed membrane (3.94 wt. % increase) absorbed approximately 0.75 wt. % more solvent than the crosslinked membrane (3.25 wt. % increase). Restriction of chain mobility by chemical crosslinks inhibits solvent swelling of the polymer gel, resulting in lower weight increase from solvent uptake.

The oxidative stability of the membranes was also examined, and the membranes showed no degradation in the oxidative vanadium solutions.

When comparing results for the two different imbibed solutions (sulfuric acid and a V(IV)/H$^+$ solution), the decrease in conductivity of the gel membranes in the vanadium electrolyte solution was believed to occur from two factors. The first being that vanadium ions may interact with the membrane by attractive forces with the negatively charged sulfonate group (pKa~-2), impeding the flow of protons. The drop-in conductivity in the PBI gel membranes for this solution was also attributed to the intrinsic conductivity of the electrolyte solution containing vanadium ions. Since the major contributor of proton conductance is the mobility of ions, it was not surprising that an increase in vanadium concentration would diminish proton conductivity of the electrolyte solution solely with regards to an increase in viscosity of the electrolyte solution. PBI gel membranes are believed to have a considerably open morphology that enhances proton conductivity by allowing not only proton transport via the Grotthuss mechanism but also mobility of the electrolyte in the membrane; thus, proton transport through the membrane could be affected by the increase in viscosity due to the incorporation of vanadium ions.

The electrolyte mobility in the PBI gel membrane is also a plausible explanation for the determined vanadium permeability. The permeabilities are not unexpected when considering the polymer solids of the membrane. The gel membrane included a relatively small amount of polymer per the amount of electrolyte in the membrane as compared to the traditional PBI membrane. Chemically crosslinking of the PBI chains in the gel membranes was expected to fill interstitial space and limit chain mobility. At first glance, the permeability of the crosslinked PBI gel membrane is less than ideal; however, this modification did have an impact when compared to the un-modified version and without having a dramatic effect on conductivity. Since this technique is impartial to the PBI derivative of choice, it could be used to hone the properties of PBI membranes as needed.

Example 2 para-PBI membrane made as described above by polymerizing TAB with terephthalic acid (TPA) according to the PPA process was rinsed several times in deionized water baths to remove PA. pH indication paper was used to ensure all the acid had been removed before proceeding. The neutralized membrane was then placed in a solution of 2.6 M sulfuric acid for at least 24 hours before characterization. In-plane ionic conductivity was measured at room temperature to be 398 mS/cm.

Example 3

A crosslinked para-PBI membrane was prepared from a membrane formed as described in Example 2. 5.5016 g of α,α'-dichloro-p-xylene (31.43 mmol) was weighed and dissolved in 600 mL of methanol to form a solution that was poured into a glass dish. The neutralized membrane was washed three times with methanol before adding it to the solution in the glass dish. The mixture was covered, heated to 30° C. and stirred with a magnetic stir bar overnight. Then, the crosslinked membrane was removed and washed with methanol using a rinse bottle. It was washed several times with deionized water, followed by another wash of methanol and deionized water. The crosslinked membrane was placed in a solution of 50 wt. % sulfuric acid for 24 hours and then hot pressed for 5 minutes at 140° C., which reduced the thickness from 0.34 mm to 0.09 mm. The hot-pressed crosslinked membrane was placed in a solution of 2.6 M sulfuric acid for 24 hours before characterization. In-plane ionic conductivity was measured at room temperature to be 492 mS/cm.

Figure 7:
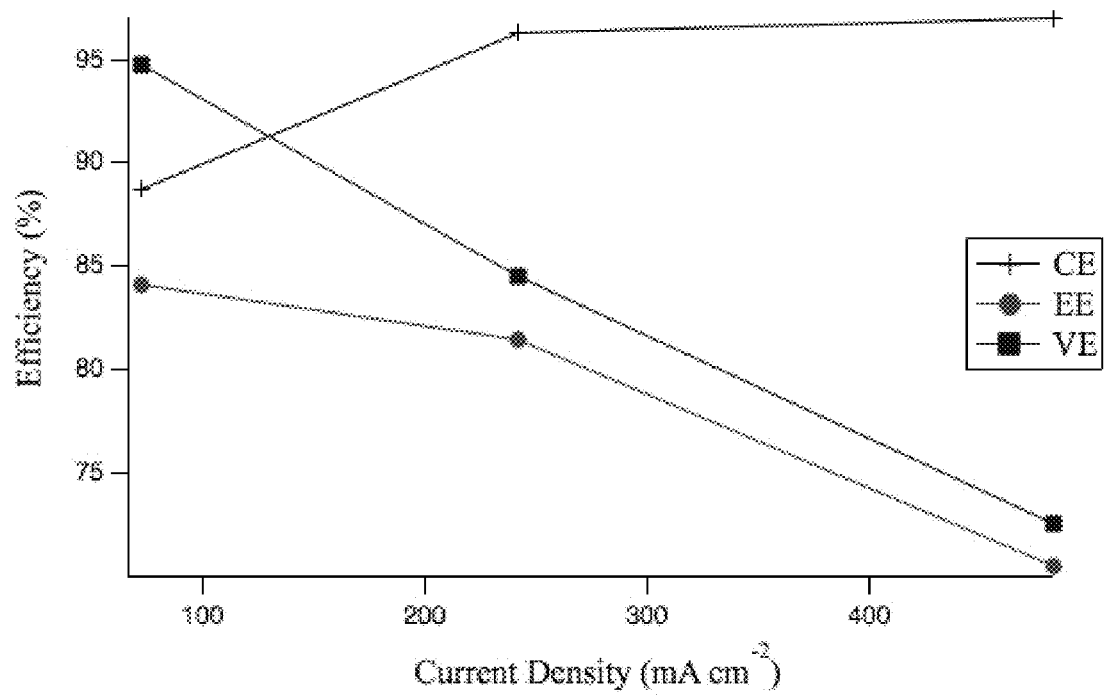
FIG. 7 presents the VE, the CE and the EE of a VRB incorporating a membrane as described herein.

The crosslinked para-PBI membrane was tested in the VRB test cell as described. VE, CE and EE were measured and recorded as illustrated in FIG. 7 and shown in Table 4, below.

TABLE 4

| Current Density (mA/cm$^2$) | C.E. (%) | E.E. (%) | V.E. (%) |
|---|---|---|---|
| 72 | 88.69 | 84.11 | 94.80 |
| 242 | 96.30 | 81.42 | 84.49 |
| 483 | 97.00 | 70.51 | 72.55 |

Example 4

A para-PBI membrane made by the PPA process as described above was first rinsed several times in deionized water baths to remove PA. pH indication paper was used to ensure all the acid had been removed before proceeding. In a 1000 mL Erlenmeyer flask, 7.88 g of 4,4'-bis(chloromethyl)biphenyl (31.38 mmol) was dissolved in 600 mL of N,N-dimethylacetamide (DMAc). The solution was poured into a glass dish, to which the membrane was added. This cross-linking reaction was stirred for 6 hours at 80° C. The membrane was subsequently washed with deionized water followed by methanol four times, then once more with water. The crosslinked membrane was placed in a solution of 2.6 M sulfuric acid for 24 hours before characterization. In-plane ionic conductivity was measured at room temperature to be 367 mS/cm.

Example 5

A para-PBI membrane made by the PPA process as described above was first rinsed several times in deionized water baths to remove PA. pH indication paper was used to ensure all the acid had been removed before proceeding. Then, 7.5 g of (3-glycidoxypropyl) trimethoxysilane (31.73 mmol) was dissolved in 600 mL of methanol to make a 0.0523 M solution, which was then poured into a glass dish containing the neutralized membrane. The crosslinking reaction was performed for 2 hours at room temperature. The membrane was then placed directly into a solution of 2.6 M sulfuric acid for at least 24 hours before characterization. In-plane ionic conductivity was measured at room temperature to be 537 mS/cm.

Example 6

42.854 g of 3,3',4,4'-tetraaminobiphenyl (TAB, 200 mmol), 4.153 g of TPA (25 mmol), 29.073 g of isophthalic acid (IPA, 175 mmol), and 685 g of PPA were added to 3-neck 1000 mL resin kettle (7:1 molar ratio of IPA:TPA, 10 wt % monomer charge) equipped with an overhead mechanical stirrer. The polymerization was conducted for 24 hours in a nitrogen atmosphere with an oil bath temperature of 220° C. The temperature was then decreased to 180° C., a reflux condenser was attached, and 103 g of deionized water was slowly added to make a 7.82 wt % stabilized polymer solution. The solution was stirred for another 8 hours. 100.5 g of the polymer solution and 3.6355 g of a meta-PBI powder with 100 mesh particle size were added to a resin kettle (1:0.5 weight ratio of polymer in solution to 100 mesh PBI powder) with a 3-neck lid and overhead mechanical stirrer. Under a nitrogen atmosphere, the mixture was heated to 165° C. for 4 hours, then increased to 200° C. for 30 minutes before casting with a 15-mil doctor blade onto a glass substrate. It was allowed to hydrolyze into a membrane in a humidity chamber regulated to 55% R.H. at 25° C. for more than 24 hours. The membrane was then rinsed several times in deionized water baths to remove PA. pH indication paper was used to ensure all the acid had been removed. The neutralized membrane was placed in a solution of 2.6 M sulfuric acid and for at least 24 hours before characterization. In-plane ionic conductivity was measured at room temperature to be 175 mS/cm.

Figure 8:
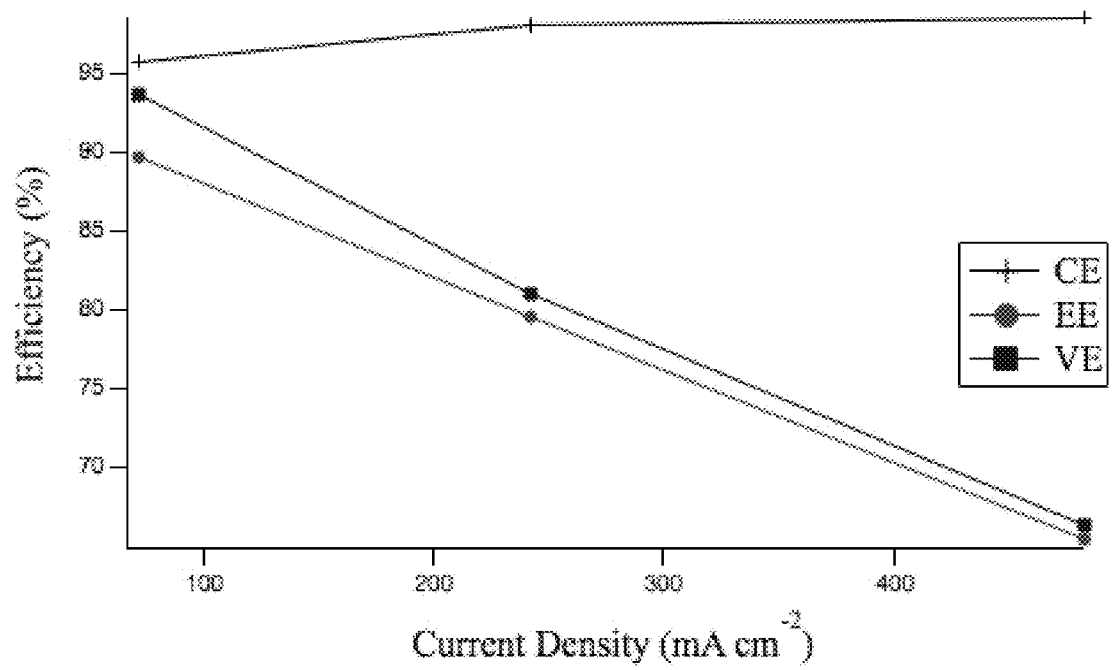
FIG. 8 presents the VE, the CE and the EE of a VRB incorporating a membrane as described herein.

The VE, CE. and EE were measured in a vanadium test cell as described. Results are shown in FIG. 8 and Table 5, below.

TABLE 5

| Current Density (mA/cm$^2$) | C.E. (%) | E.E. (%) | V.E. (%) |
|---|---|---|---|
| 72 | 95.70 | 89.63 | 93.63 |
| 242 | 98.09 | 79.58 | 81.07 |
| 483 | 98.48 | 65.45 | 66.35 |

Example 7

6.8811 g of TAB (32.11 mmol), 0.6673 g of TPA (4.01 mmol), 4.6689 g of isophthalic acid (IPA, 28.10 mmol), and 110 g of PPA were added to 100 mL reaction kettle (7:1 ratio of IPA:TPA, 11 wt. % monomer charge) and equipped with an overhead mechanical stirrer. The polymerization was conducted for 24 hours in a nitrogen atmosphere with an oil bath temperature of 220° C. The solution was applied by means of a doctor blade with a 20-mil gate thickness to a glass plate and subsequently hydrolyzed for more than 24 hours. The membrane was rinsed several times in deionized water baths to remove PA. pH indication paper was used to ensure all the acid had been removed before proceeding. It was then submerged in a 1:1 solution of isopropanol and 85 wt. % PA and stirred for 24 hours. It was removed from the mixture and left to evaporate on the bench top for 30 minutes. The membrane was soaked in 2.6 M sulfuric acid solution for 24 hours before characterization. In-plane ionic conductivity was measured at room temperature to be 228 mS/cm.

Figure 9:
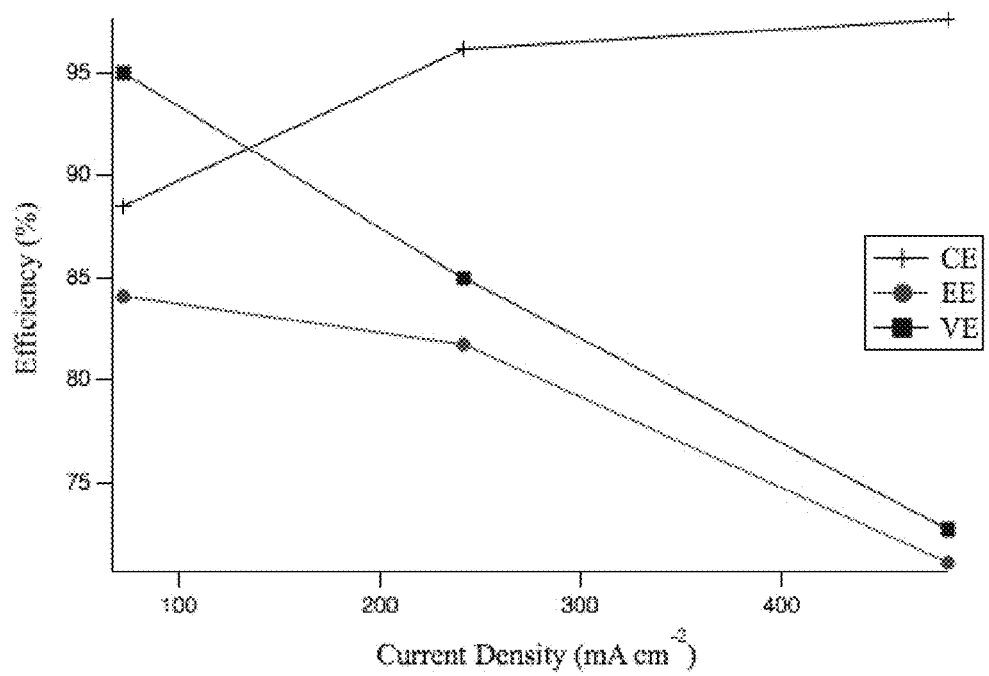
FIG. 9 presents the VE, the CE and the EE of a VRB incorporating a membrane as described herein.

A VRB test cell was assembled as described above. The VE, CE. and EE were measured. Results are shown in FIG. 9 and Table 6, below.

TABLE 6

| Current Density (mA/cm$^2$) | C.E. (%) | E.E. (%) | V.E. (%) |
|---|---|---|---|
| 72 | 88.47 | 84.06 | 95.00 |
| 242 | 96.12 | 81.71 | 84.94 |
| 483 | 97.58 | 71.10 | 72.76 |

Example 8

1.778 g TAB (8.30 mmol), 2.226 g s-TPA (8.30 mmol) and 96 g of PPA were added to 100 mL reaction kettle (4 wt. % monomer charge) equipped with an overhead mechanical stirrer. The polymerization was conducted for 48 hours in a nitrogen atmosphere at 220° C. The solution was applied by means of a doctor blade with a 15-mil gate thickness to a glass plate and subsequently hydrolyzed for more than 24 hours. The membrane was rinsed several times in deionized water baths to remove PA. pH indication paper was used to ensure all the acid had been removed. 700 mL of methanol and 6.543 g of α,α'-dichloro-p-xylene (37.38 mmol) were mixed to form a solution to which the neutralized membrane was added and stirred at room temperature for 24 hours. The membrane was then removed from the solution and washed with deionized water and methanol multiple times. It was placed in a deionized water bath and then in a 2.6 M sulfuric acid bath for 24 hours before characterization. In-plane ionic conductivity was measured at room temperature to be 289 mS/cm.

Example 9

5.937 g TAB (27.71 mmol), 5.490 g of 2,5-dihydroxy-terephthalic acid (diOH-TPA, 27.71 mmol), and 362.32 g PPA were added to a reaction kettle and stirred under a nitrogen atmosphere with an overhead mechanical stirrer. The polymerization was conducted for 24 hours in a nitrogen atmosphere at 220° C. The solution was applied by means of a doctor blade with a 20-mil gate thickness to a glass plate and subsequently hydrolyzed for more than 24 hours. The membrane imbibed in PA was rinsed several times in deionized water baths. pH indication paper was used to ensure all the acid had been removed before proceeding. The neutralized membrane was placed in a solution of 2.6 M sulfuric acid and stirred for 24 hours before characterization. In-plane ionic conductivity was measured at room temperature to be 608 mS/cm.

Example 10

5.9599 g TAB (27.81 mmol), 2.3104 g of IPA (13.91 mmol), 3.7297 g of 5-sulfoisopthalic acid monosodium salt (5SIPA, 13.91 mmol) and 138 g PPA were added to 100 mL reaction kettle (1:1 ratio of IPA:5SIPA, 8 wt. % monomer charge) equipped with an overhead mechanical stirrer. The polymerization was conducted for 24 hours in a nitrogen atmosphere at 220° C. The solution was applied by means of a doctor blade with a 20-mil gate thickness to a glass plate and subsequently hydrolyzed for more than 24 hours. The membrane was rinsed several times in deionized water baths to remove PA. pH indication paper was used to ensure all the acid had been removed before proceeding. The neutralized membrane was placed in a solution of 2.6 M sulfuric acid and stirred for 24 hours before characterization. In-plane ionic conductivity was measured at room temperature to be 109 mS/cm.

Comparative Example 1

Commercially available meta-PBI film, prepared from casting and drying N,N-dimethylacetamide solutions, was used as received. The film was placed in a solution of 2.6 M sulfuric acid for 24 hours before characterization. In-plane ionic conductivity in sulfuric acid was measured at room temperature to be 13.1 mS/cm. In-plane ionic conductivity after soaking in a V(IV)/H$^+$ solution (1.5 M VOSO$_4$+2.6 M sulfuric acid) for 3 days was measured at room temperature to be 12.2 mS/cm. The content of polymer solids in the membrane was determined to be 65.6%.

Figure 10:
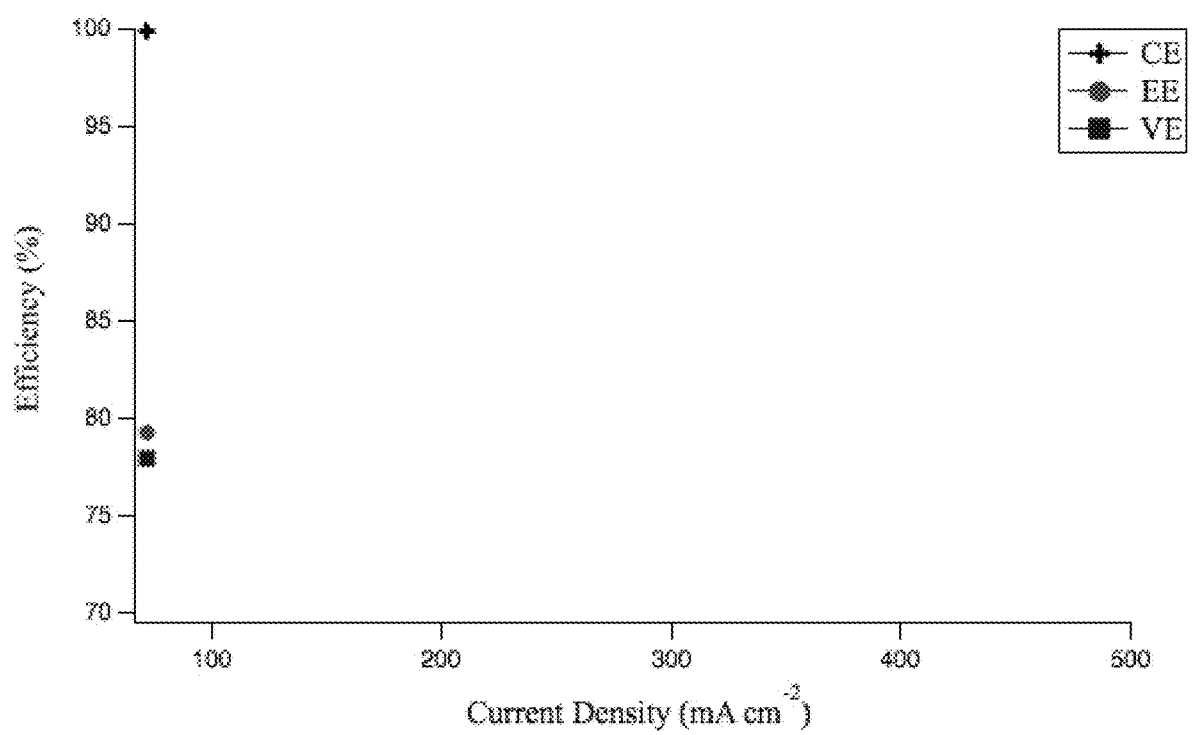
FIG. 10 presents the VE, the CE and the EE of a VRB incorporating a comparison membrane.

A VRB test cell was assembled as described above. The VE, CE. and EE were measured and the results are shown in FIG. 10 and Table 7.

TABLE 7

| Current Density (mA/cm$^2$) | C.E. (%) | E.E. (%) | V.E. (%) |
|---|---|---|---|
| 72 | 99.9 | 79.28 | 77.96 |
| 242 | — | — | — |
| 483 | — | — | — |

As shown, at higher current densities, the cell had no performance and could not be operated at current densities above about 72 mA/cm$^2$. This is because voltage is related to the membrane conductivity, which is very low for this membrane.

Figure 11:
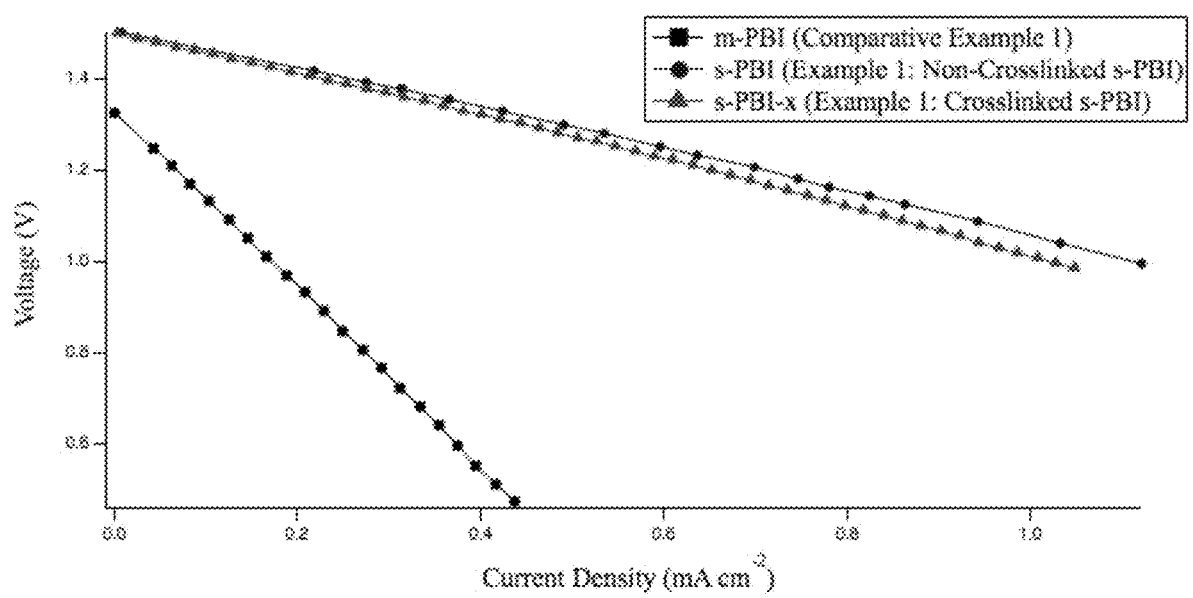
FIG. 11 compares the polarization curves for a VRB incorporating a comparison membrane with two other batteries, each incorporating a membrane as described herein.

The polarization curve with 80% state-of-charge electrolytes was also determined and compared to those of Example 1, above. The comparison is shown in FIG. 11.

Comparative Example 2

Commercially available meta-PBI film, prepared from casting and drying N,N-dimethylacetamide solutions, was used as received. A crosslinking reaction was conducted by first mixing 1000 mL of methanol with 9.27 g α,α'-dichloro-p-xylene (52.95 mmol) to form a solution which was poured into a glass dish containing the membrane. The solution with the membrane was covered, heated to 30° C. and stirred with a magnetic stir bar for 24 hours. The crosslinked membrane was removed from the solution, washed and left to dry in the open air. After drying, the crosslinked membrane was placed in a solution of 2.6 M sulfuric acid for 24 hours before characterization. In-plane ionic conductivity was measured at room temperature to be 15.6 mS/cm.

Comparative Example 3

Commercially available meta-PBI film, prepared from casting and drying N,N-dimethylacetamide solutions, was used as received. The membrane was placed in a bath of 85 wt. % PA for 48 hours. The membrane was rinsed several times in deionized water baths to remove PA. pH indication paper was used to ensure all the acid had been removed before proceeding. Once neutral, it was placed in a solution of 2.6 M sulfuric acid for 24 hours before characterization. In-plane ionic conductivity was measured at room temperature to be 11.6 mS/cm.

Comparative Example 4

Commercially available meta-PBI film, prepared from casting and drying N,N-dimethylacetamide solutions, was used as received. The membrane was placed in a bath of 85 wt. % PA for 48 hours. A crosslinking reaction was conducted by first mixing 1000 mL of methanol with 9.40 g α,α'-dichloro-p-xylene (53.70 mmol) to form a solution which was poured into a glass dish containing the membrane. The solution with the membrane was covered, heated to 30° C. and stirred with a magnetic stir bar for 25 hours. The crosslinked membrane was then removed from the solution and washed in methanol and deionized water before being allowed to dry in the open air. The crosslinked membrane was then placed in a solution of 2.6 M sulfuric acid for 24 hours before characterization. In-plane ionic conductivity was measured at room temperature to be 16.7 mS/cm.

While certain embodiments of the disclosed subject matter have been described using specific terms, such description is for illustrative purposes only, and it is to be understood that changes and variations may be made without departing from the spirit or scope of the subject matter.

What is claimed is:

1. A method for forming a redox flow battery membrane comprising:
    forming a polymerization composition, the polymerization composition comprising a polyphosphoric acid, an aromatic or heteroaromatic tetraamino compound and an aromatic or heteroaromatic carboxylic acid compound, wherein the aromatic or heteroaromatic carboxylic acid compound comprises an aromatic or heteroaromatic polycarboxylic acid or ester, anhydride, or acid chloride thereof and/or comprises an aromatic or heteroaromatic diaminocarboxylic acid;
    polymerizing the aromatic or heteroaromatic tetraamino compound with the aromatic or heteroaromatic carboxylic acid compound to form a polymer solution comprising a polybenzimidazole dissolved in the polyphosphoric acid;
    shaping the polymer solution to form a membrane precursor comprising the polymer solution;
    hydrolyzing at least a portion of the polyphosphoric acid of the membrane precursor to form phosphoric acid and water, upon which the membrane precursor forms a gel membrane comprising the polybenzimidazole, the gel membrane being a self-supporting membrane capable of incorporating a liquid content of about 60 wt. % or more without loss of structure;
    rinsing the gel membrane to remove the phosphoric acid and any remaining polyphosphoric acid; and
    imbibing the rinsed gel membrane with a redox flow battery supporting electrolyte.

2. The method of claim 1, wherein the polymerization composition comprises the aromatic or heteroaromatic tetraamino compound and the aromatic or heteroaromatic carboxylic acid compound in a concentration of about 10 wt. % or less of the polymerization composition.

3. The method of claim 1, wherein the aromatic or heteroaromatic tetraamino compound comprises 2,3,5,6-tetraminopyridine; 3,3',4,4'-tetraminodiphenylsulfone; 3,3',4,4'-tetraminodiphenyl ether; 1,2,4,5-tetraminobenzene; 3,3',4,4'-tetraminobenzophenone; 3,3',4,4'-tetraminodiphenylmethane; and 3,3',4,4'-tetraminodiphenyldimethyl-methane or salts thereof, or any combination thereof.

4. The method of claim 1, wherein the aromatic or heteroaromatic tetraamino compound comprises 3,3',4,4'-tetraminobiphenyl.

5. The method of claim 1, wherein the aromatic or heteroaromatic carboxylic acid compound comprises a dicarboxylic acid.

6. The method of claim 5, wherein the dicarboxylic acid comprises isophthalic acid; terephthalic acid; 3-sulfophthalic acid; 5-sulfoisophthalic acid; 2-sulfoterephthalic acid; tetrasulfophthalic acid; tetrasulfoisophthalic acid; tetrasulfoterephthalic acid; 5-hydroxyisophthalic acid; 4-hydroxyisophthalic acid; 2-hydroxyterephthalic acid; 2,5-dihydroxyterephthalic acid; 2,6-dihydroxyisophthalic acid; 4,6-dihydroxyisophthalic acid; 2,3-dihydroxyphthalic acid; 2,4-dihydroxyphthalic acid; 3,4-dihydroxyphthalic acid; 1,8-dihydroxynaphthalene-3,6-dicarboxylic acid; diphenylsulfone-4,4'-dicarboxylic acid; or any combination thereof.

7. The method of claim 1, wherein the membrane precursor has a thickness of from 20 μm to about 4,000 μm.

8. The method of claim 1, wherein the hydrolysis is carried out at a temperature of from about 0° C. to about 150° C. and at a relative humidity of from about 20% to 100%.

9. The method of claim 1, further comprising crosslinking the gel membrane.

10. The method of claim 1,
wherein
the redox flow battery membrane exhibits an in-plane ionic conductivity in a 2.6 M sulfuric acid solution of about 100 mS/cm or greater.

11. The method of claim 1, wherein the polybenzimidazole of the gel membrane comprises one or more of the following repeating units:

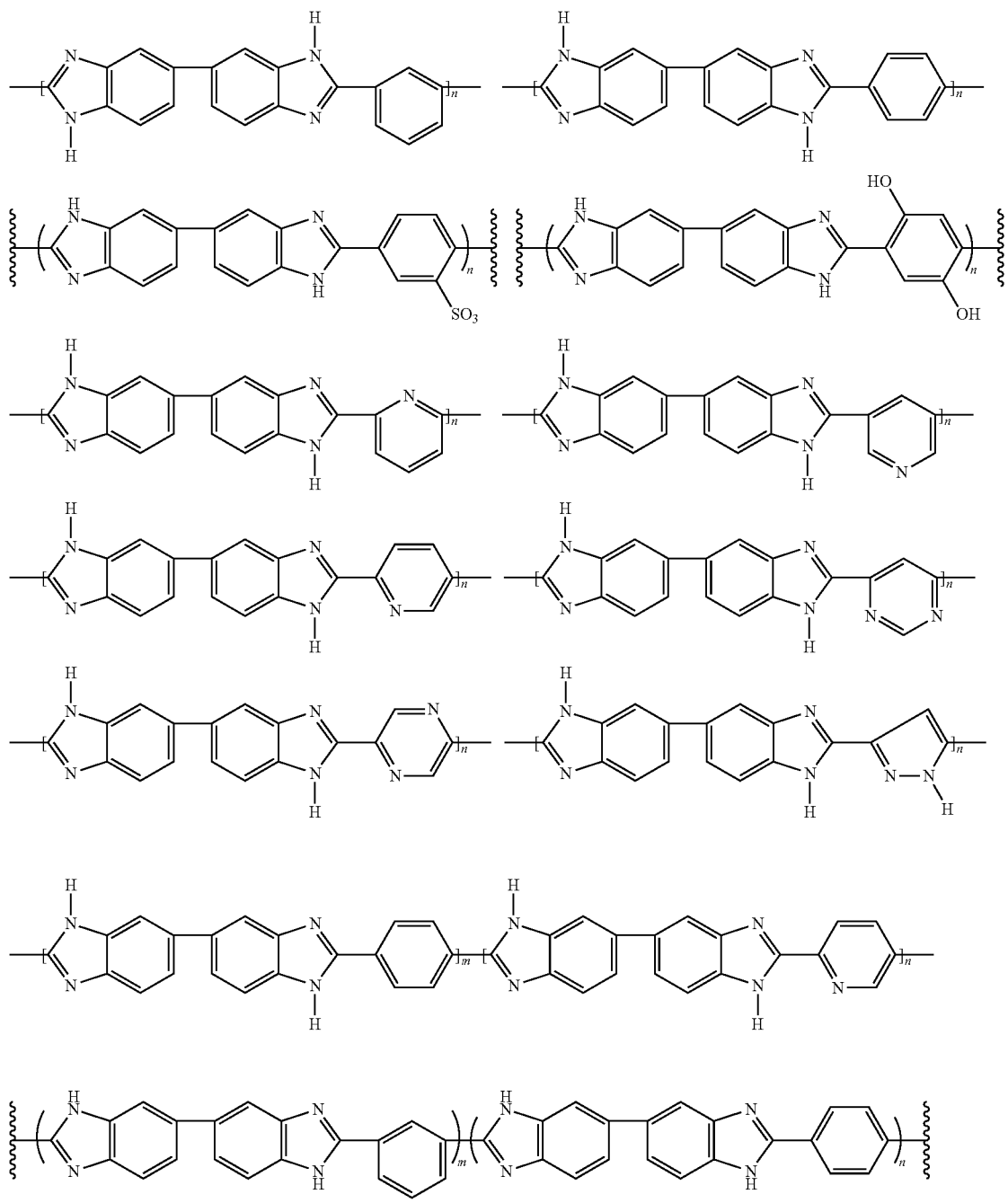

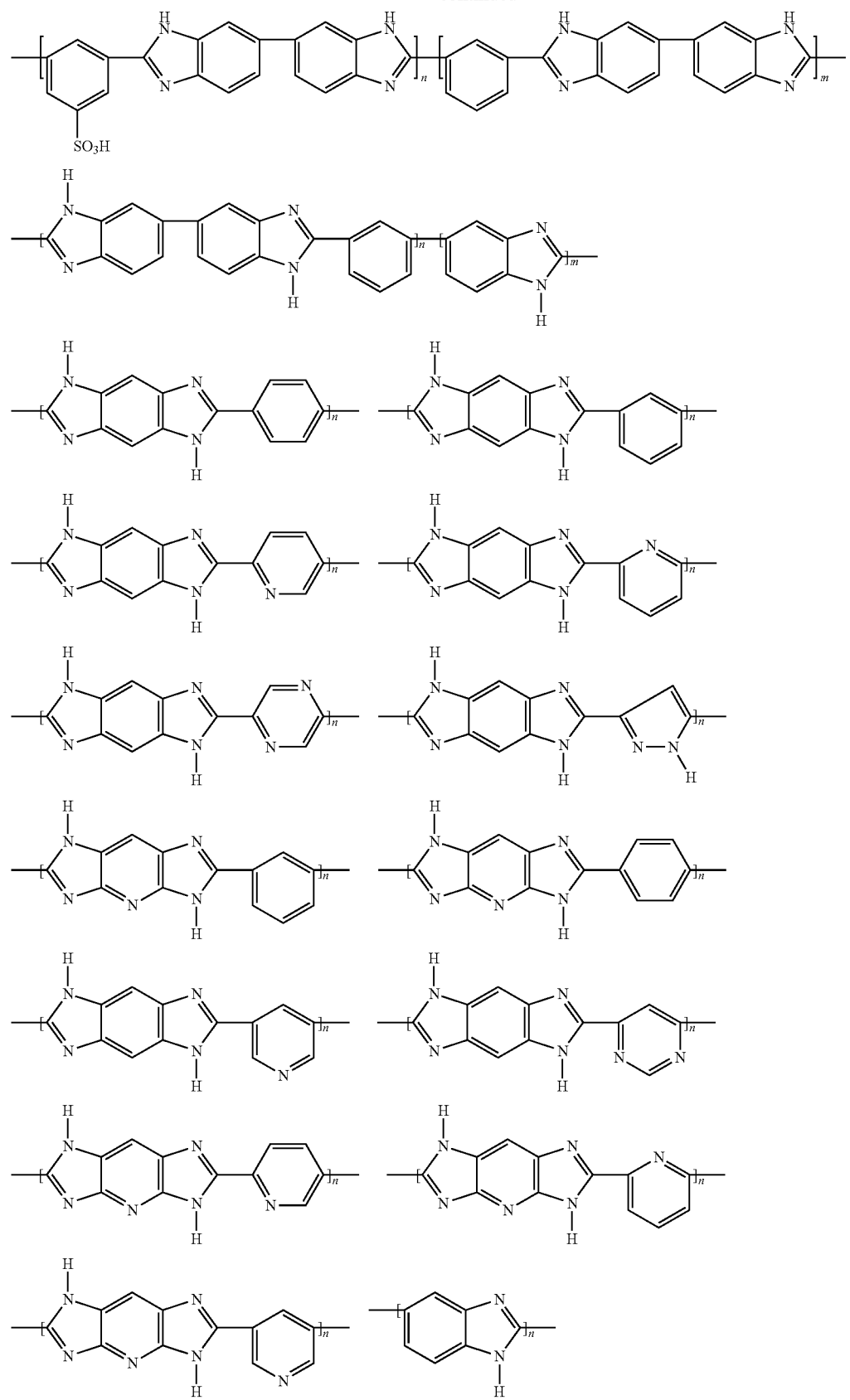

or any combination thereof, in which n and m are each independently 1 or greater.

12. The method of claim 1, wherein the supporting electrolyte comprises a mineral acid, an organic acid, or a combination of one or more mineral acids and/or one or more organic acid.

13. The method of claim 1, wherein the supporting electrolyte comprises hydrochloric acid, nitric acid, fluorosulfonic acid, sulfuric acid, acetic acid, formic acid, p-toluene sulfonic acid, trifluoromethane sulfonic acid, or any mixture thereof.

14. The method of claim 1, wherein the supporting electrolyte comprises sodium chloride, potassium chloride, sodium hydroxide, potassium hydroxide, sodium sulfide, potassium sulfide, or any combination thereof; or the supporting electrolyte comprising a tetraalkylammonium cation.

15. The method of claim 1, wherein the rinsed gel membrane is imbibed with a solution comprising the redox flow battery supporting electrolyte, the solution including the redox flow battery supporting electrolyte at a concentration of from about 1 M to about 25 M.

16. The method of claim 1, further comprising incorporating a particulate into the gel membrane.

17. A method for forming a redox flow battery membrane comprising:
    forming a polymerization composition, the polymerization composition comprising a polyphosphoric acid, an aromatic or heteroaromatic tetraamino compound and an aromatic or heteroaromatic carboxylic acid compound, wherein the aromatic or heteroaromatic carboxylic acid compound comprises an aromatic or heteroaromatic polycarboxylic acid or ester, anhydride, or acid chloride thereof and/or comprises an aromatic or heteroaromatic diaminocarboxylic acid;
    polymerizing the aromatic or heteroaromatic tetraamino compound with the aromatic or heteroaromatic carboxylic acid compound to form a polymer solution comprising a polybenzimidazole dissolved in the polyphosphoric acid;
    shaping the polymer solution to form a membrane precursor comprising the polymer solution;
    hydrolyzing at least a portion of the polyphosphoric acid of the membrane precursor to form phosphoric acid and water, upon which the membrane precursor forms a gel membrane comprising the polybenzimidazole, the gel membrane being a self-supporting membrane capable of incorporating a liquid content of about 60 wt. % or more without loss of structure;
    rinsing the gel membrane to remove the phosphoric acid and any remaining polyphosphoric acid; and
    imbibing the rinsed gel membrane with a redox flow battery supporting electrolyte comprising sulfuric acid.

18. The method of claim 17, wherein the polymer solution exhibits an intrinsic viscosity at shaping of about 0.8 dL/g or greater.

19. The method of claim 17, wherein the polymer solution is shaped according to a process comprising casting, spray coating, or knife coating.

20. The method of claim 17, wherein the gel membrane is rinsed multiple times.

21. The method of claim 17, wherein the gel membrane is rinsed according to a process that comprises soaking the gel membrane in a water bath.

22. The method of claim 21, wherein the water bath is heated.

23. The method of claim 17, wherein the rinsing is carried out at ambient temperature.

* * * * *